(12) United States Patent
Carey et al.

(10) Patent No.: US 11,216,416 B2
(45) Date of Patent: Jan. 4, 2022

(54) MANAGING SNAPSHOTTING OF A DATASET USING AN ORDERED SET OF B+ TREES

(71) Applicant: Microsoft Technology Licensing, LLC, Redmond, WA (US)

(72) Inventors: Omar Carey, Redmond, WA (US); Rajsekhar Das, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 16/872,203

(22) Filed: May 11, 2020

(65) Prior Publication Data

US 2021/0349850 A1     Nov. 11, 2021

(51) Int. Cl.
    *G06F 7/00*       (2006.01)
    *G06F 16/11*      (2019.01)
    *G06F 16/182*     (2019.01)
    *G06F 16/84*      (2019.01)
    *G06F 16/2455*    (2019.01)
    *G06F 16/22*      (2019.01)

(52) U.S. Cl.
    CPC .......... *G06F 16/128* (2019.01); *G06F 16/182* (2019.01); *G06F 16/2246* (2019.01); *G06F 16/24554* (2019.01); *G06F 16/86* (2019.01)

(58) Field of Classification Search
    CPC .. G06F 16/128; G06F 16/182; G06F 16/2246; G06F 16/86
    USPC .................................. 707/634, 649, 797, 812
    See application file for complete search history.

(56) References Cited

U.S. PATENT DOCUMENTS

| 8,533,410 | B1  |   | 9/2013 | Corbett et al. |
|-----------|-----|---|--------|----------------|
| 2017/0039231 | A1 | * | 2/2017 | Ishizaki ............... G06F 16/2246 |
| 2018/0225316 | A1 | * | 8/2018 | Boles .................. G06F 16/2246 |
| 2019/0004704 | A1 |   | 1/2019 | Rathi et al. |
| 2020/0019619 | A1 |   | 1/2020 | Sarda et al. |
| 2020/0065196 | A1 |   | 2/2020 | Desai et al. |

OTHER PUBLICATIONS

"International Search Report & Written Opinion Issued in PCT Application No. PCT/US21/026504", dated Jun. 23, 2021, 12 Pages.

* cited by examiner

*Primary Examiner* — Md I Uddin
(74) *Attorney, Agent, or Firm* — Workman Nydegger

(57) ABSTRACT

A current state of a dataset is represented by a mutable B+ tree, while each snapshot of the dataset is represented by an immutable B+ tree. An ordering of B+ trees in the ordered set logically arranges those B+ trees into layers, with the mutable B+ tree representing the current state of the dataset being logically arranged as an upper layer, and with immutable B+ trees representing snapshots of the dataset being progressively arranged as lower layers with the oldest snapshot being a lowest layer. Each B+ tree stores dataset records with a strong or a weak reference state; strong records are independent of any lower-layer record, while weak records are dependent on at least one lower-layer record. A snapshot deletion includes merging the snapshot's corresponding B+ tree with its highest neighbor B+ tree, including merging overlapping records based on their weak vs. strong reference state.

19 Claims, 15 Drawing Sheets

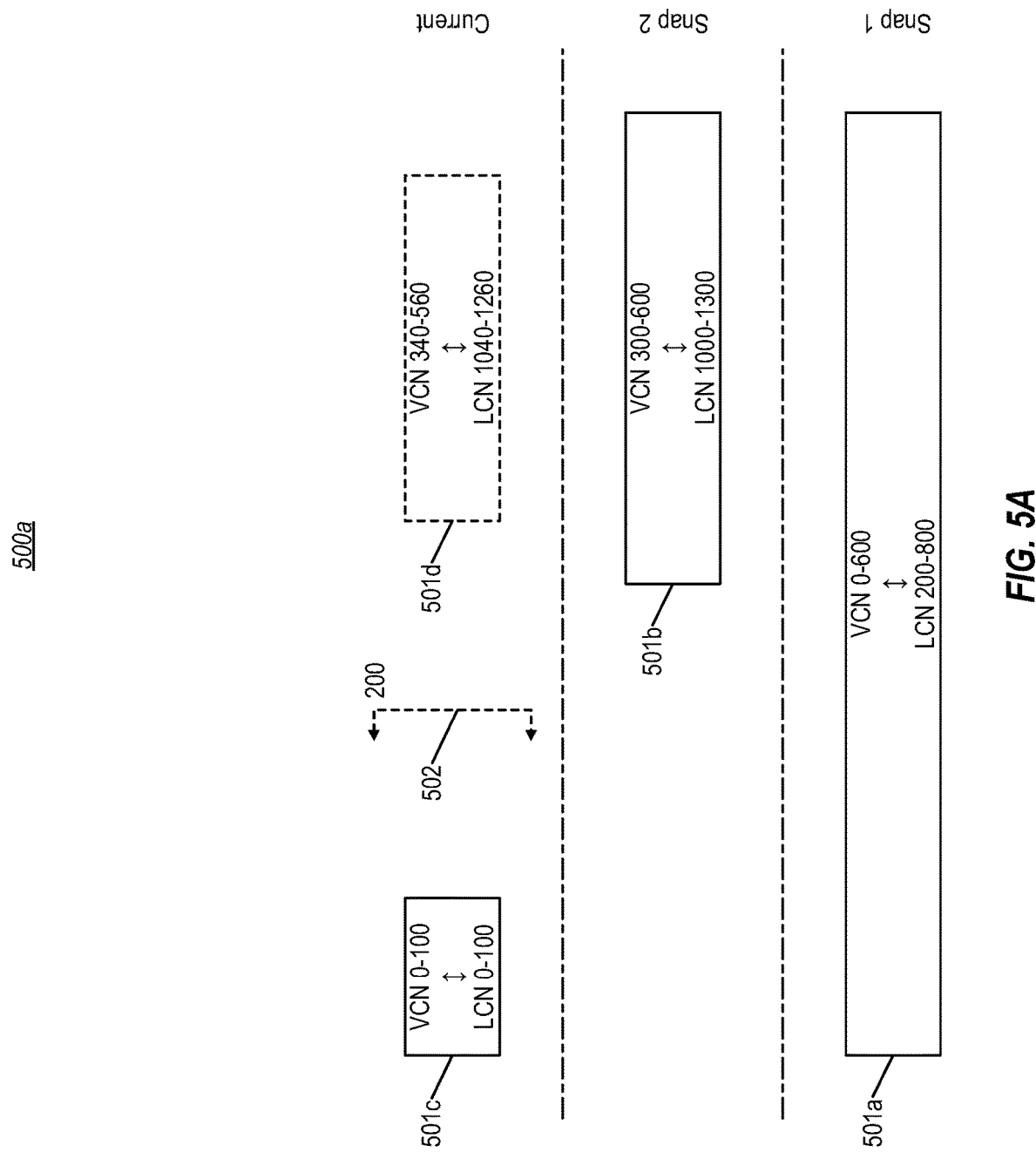

ered set of B+ trees.

MANAGING SNAPSHOTTING OF A DATASET USING AN ORDERED SET OF B+ TREES

TECHNICAL FIELD

The present disclosure relates to systems, methods, and devices that manage creating and deleting of snapshots of a dataset using an ordered set of B+ trees.

BACKGROUND

In computing, a B+ tree is a self-balancing hierarchical tree structure with a variable, but often large, number of children per node. A B+ tree comprises at least a root node, and can include additional internal and leaf nodes. In general, B+ trees represent a range of keys, with leaf nodes comprising records for key-value mappings corresponding to at least a subset of that range. The root node of a B+ tree represents the entire range of keys covered by the tree, every internal node (if any) represents a subinterval of that range, and each leaf node stores zero or more records for sets of key-value pairs. In general, a B+ tree has a branching factor b, which is defined as the maximum number of child nodes to which any internal nodes are permitted to point. In many implementations, internal nodes are constrained to have a number of children m that is defined as $[b/2]<=m<=b$, and the root node is constrained to have a number of children that is defined as $2<=m<=b$. Leaf nodes have no children, but in many implementations are constrained to store a number of keys k (and their mappings) that is defined as $[b/2]<=k<=b$. In many implementations, the root node of a B+ tree is permitted to represent one or more key-value pairs if it has no children; in this case, the root node is constrained to represent a number of keys k that is defined as $1<=k<=b-1$.

To illustrate, FIG. 1 illustrates an example 100 of a B+ tree that includes key-value mappings for the keys 1, 3, 5, 7, 9, 10, 12, 13, 15, and 17. In example 100, a root node 101 represents an entire key range (e.g., 0-∞), divided into subintervals 0-11 and 12-∞; an internal node 102 represents the subinterval of keys 0-11, divided further into subintervals 0-4, 5-8, and 9-11, and an internal node 103 represents the subinterval of keys 12-∞, divided further into subintervals 12-14 and 15-∞; a leaf node 104 corresponds to subinterval 0-4 and stores key-value mappings for keys 1 and 3, a leaf node 105 corresponds to subinterval 5-8 and stores key-value mappings for keys 5 and 7; a leaf node 106 corresponds to subinterval 9-11 and stores key-value mappings for keys 9 and 10; a leaf node 107 corresponds to subinterval 12-14 and stores key-value mappings for keys 12 and 13; and a leaf node 108 corresponds to subinterval 15-∞ and stores key-value mapping for keys 15 and 17. The asterisks in leaf nodes 104-108 indicate that each key is associated with a mapping.

In order to locate a given key-value mapping within the B+ tree of example 100, a requested key is progressively searched down the tree, starting at the root node, and following internal nodes in order to locate a leaf node correspond to an appropriate subinterval. For example, searching for the key 5 at root node 101 leads to internal node 102 (i.e., corresponding to subinterval 0-11), and searching for the key 5 at internal node 102 leads to leaf node 105 (i.e., corresponding to subinterval 5-8). Here, the key 5 is found in leaf node 105. In another example, searching for the key 14 at root node 101 leads to internal node 103 (i.e., corresponding to subinterval 12-∞), and searching for the key 14 at internal node 103 leads to leaf node 107 (i.e., corresponding to subinterval 12-14). Here, the key 14 is not found in the tree.

B+ trees are frequently used to represent data structures (e.g., tables), in which the data structure comprises records (e.g., rows) that include one or more key-value pair mappings. B+ trees often have a relatively high branching factor (e.g., on the order of 100's or more), and thus a relatively high fanout (i.e., number of pointers to child nodes from a root or internal node), when compared to other types of trees such as binary search trees (which are limited to two children per node). This high fanout makes them suitable (among other things) for representing data structures (e.g., filesystem metadata) representing mappings into block-oriented storage pools and devices. For example, in general, a tree with a higher fanout has fewer internal nodes and thus requires fewer node traversals to locate a leaf node storing a given key-value mapping than a tree with a lower fanout.

Many systems support snapshotting features that enable files, volumes, pools, database tables, etc. to be rolled back to a prior state. Taking filesystems as an example, existing filesystems implement snapshotting through use of reference counting. In many implementations, the underlying filesystem data structure(s) increment a count for a block in a block-oriented storage device when a snapshot referencing the block is added, and decrements the count when a snapshot referencing the block is removed. So long as the count is non-zero, the block is considered to be used by the filesystem; if the count becomes zero, however, the block is no longer is considered to be used by the filesystem and can be freed. However, maintaining reference counts imposes significant overheads to maintenance of filesystem metadata. For example, when using reference counting deletion of a snapshot requires extensive tree traversals to update reference counts, which results in significant processor, input/output (I/O), and memory overheads while processing the deletion. In addition, when using reference counting deletion of a snapshot requires locks on significant portions of filesystem metadata, which in turn blocks accesses to files, volumes, pools, etc. while processing the deletion.

BRIEF SUMMARY

At least some embodiments described herein manage snapshotting of a dataset using an ordered set of B+ trees, including enabling efficient and non-blocking deletion of snapshots. In embodiments, the "current" state of a dataset is represented by a mutable B+ tree in the ordered set of B+ trees, while each "snapshot" of the dataset is represented by an additional immutable B+ tree in the ordered set of B+ trees. An ordering of the B+ trees in the ordered set logically arranges them into different layers, with the mutable B+ tree representing the current state of the dataset being logically arranged as an upper (e.g., topmost) layer, and with immutable B+ trees representing snapshots of the dataset being progressively arranged as lower layers with the oldest snapshot being a lower (e.g., bottommost) layer. Each B+ tree stores dataset records with either a strong or a weak reference state. A record with a strong reference state is independent of any lower-layer record, and a record with a weak reference state is dependent on at least one lower-layer record. A snapshot deletion is accomplished by merging the snapshot's corresponding B+ tree with its highest neighbor B+ tree, including merging overlapping records based on their weak vs. strong reference state.

In embodiments, deletion of a snapshot is accomplished in O(1) time, by removing or deactivating a reference the B+ tree corresponding to the snapshot from the ordered set of B+ trees. In embodiments, this O(1) deletion performance is enabled by the use of weak and strong records within the B+ trees, as opposed to use of reference counting. For example, using weak and strong records enables a B+ tree corresponding to a snapshot to be deleted or dereferenced in order to deactivate any records in that B+ tree from an active set, and avoids the need to traverse one or more B+ trees in order to update reference counts.

In embodiments, a B+ tree corresponding to a deleted snapshot is merged with a neighboring B+ tree. In embodiments, merger of a B+ tree with a neighboring B+ tree frees resources, including resources referred to by records in the B+ tree, and as well as resources associated with storing the B+ tree itself. In embodiments, this merging is accomplished asynchronously with other accesses to the dataset represented by the ordered set of B+ trees. Thus, the merging is accomplished without taking I/O locks on the dataset represented by the ordered set of B+ trees (and, correspondingly without taking I/O locks the resources associated with the dataset generally). Thus, for example, if the dataset corresponds to a file, this merger is accomplished without taking an I/O lock on the file generally.

Embodiments include methods, systems, and computer program products that manage snapshotting of a dataset using an ordered set of B+ trees representing the dataset. For example, some embodiments of managing snapshotting of a dataset using an ordered set of B+ trees representing the dataset include creating a snapshot of a dataset using an ordered set of B+ trees representing the dataset. At least some of these embodiments operate based at least on receiving a request to create a snapshot of the dataset. These embodiments identify the ordered set of B+ trees. Each leaf node within each B+ tree in the ordered set of B+ trees represents a corresponding page key range and store zero or more records for the corresponding key range, and a corresponding range of resources mapped thereto, that falls within the corresponding page key range. The embodiments also identify an existing B+ tree within the ordered set of B+ trees. The existing B+ tree is mutable and is a beginning B+ tree in the ordered set of B+ trees. These embodiments also convert the existing B+ tree to an immutable state. The existing B+ tree corresponds to the requested snapshot of the dataset. These embodiments also insert a new B+ tree in front of the existing B+ tree in the ordered set of B+ trees to become the beginning B+ tree in the ordered set of B+ trees. The new B+ tree is empty and mutable.

Additional or alternative embodiments of managing snapshotting of a dataset using an ordered set of B+ trees representing the dataset include processing a key-based request on a snapshotted dataset using an ordered set of B+ trees representing the dataset. At least some of these embodiments operate after inserting the new B+ tree into to the ordered set of B+ trees, and based at least on receiving a request that includes a requested key. Starting with the beginning B+ tree, these embodiments progressively search each B+ tree in the ordered set of B+ trees, until a particular B+ tree is identified that includes a particular leaf node storing a particular record for the particular key range that overlaps with the requested key. These embodiments also store a new record within a leaf node of the new B+ tree. The new record (i) corresponds to a key range, and a range of resources mapped thereto, that starts with the requested key and that includes at least a subset of the particular key range, and (ii) is flagged as having a weak reference state that is dependent on the particular record.

Additional or alternative embodiments of managing snapshotting of a dataset using an ordered set of B+ trees representing the dataset include deleting a snapshot of a dataset using an ordered set of B+ trees representing the dataset. At least some of these embodiments operate based at least on receiving a request to delete an identified snapshot of the dataset. These embodiments identify a subject B+ tree in the ordered set of B+ trees that corresponds to the identified snapshot, and identify a neighbor B+ tree that precedes the subject B+ tree in the ordered set of B+ trees. These embodiments then merge the neighbor B+ tree and the subject B+ tree based on at least one of (i) pushing a first record in the subject B+ tree that has no intersecting record in the neighbor B+ tree into the neighbor B+ tree, (ii) pushing a second record in the neighbor B+ tree that has no intersecting record in the subject B+ tree into the subject B+ tree, (iii) merging a third record in the neighbor B+ tree into the subject B+ tree, the third record having a third intersecting record in the subject B+ tree, the third record and the third intersecting record having identical key ranges; or (iv) merging a fourth record in the subject B+ tree into the neighbor B+ tree, the fourth record having a fourth intersecting record in the neighbor B+ tree, the fourth record and the fourth intersecting record having identical key ranges.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5A illustrates an example of a dataset that is represented by an ordered set of three B+ trees;

DETAILED DESCRIPTION

At least some embodiments described herein manage snapshotting of a dataset using an ordered set of B+ trees, including enabling efficient and non-blocking deletion of snapshots. In embodiments, the "current" state of a dataset is represented by a mutable B+ tree in the ordered set of B+ trees, while each "snapshot" of the dataset is represented by an additional immutable B+ tree in the ordered set of B+ trees. An ordering of the B+ trees in the ordered set logically arranges them into different layers, with the mutable B+ tree representing the current state of the dataset being logically arranged as an upper (e.g., topmost) layer, and with immutable B+ trees representing snapshots of the dataset being progressively arranged as lower layers with the oldest snapshot being a lower (e.g., bottommost) layer. Each B+ tree stores dataset records with either a strong or a weak reference state. A record with a strong reference state is independent of any lower-layer record, and a record with a weak reference state is dependent on at least one lower-layer record. A snapshot deletion is accomplished by merging the snapshot's corresponding B+ tree with its highest neighbor B+ tree, including merging overlapping records based on their weak vs. strong reference state.

Figure 1:
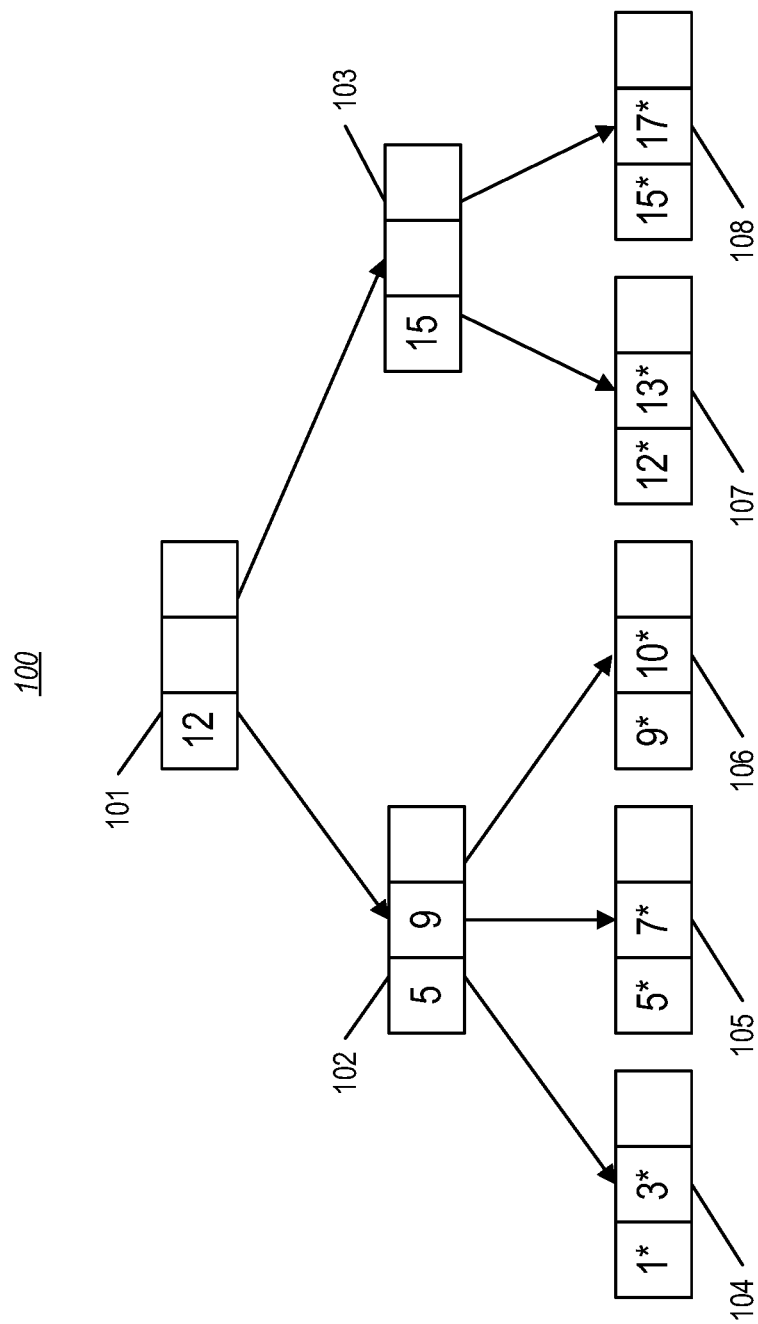
FIG. 1 illustrates an example B+ tree.
Figure 2:
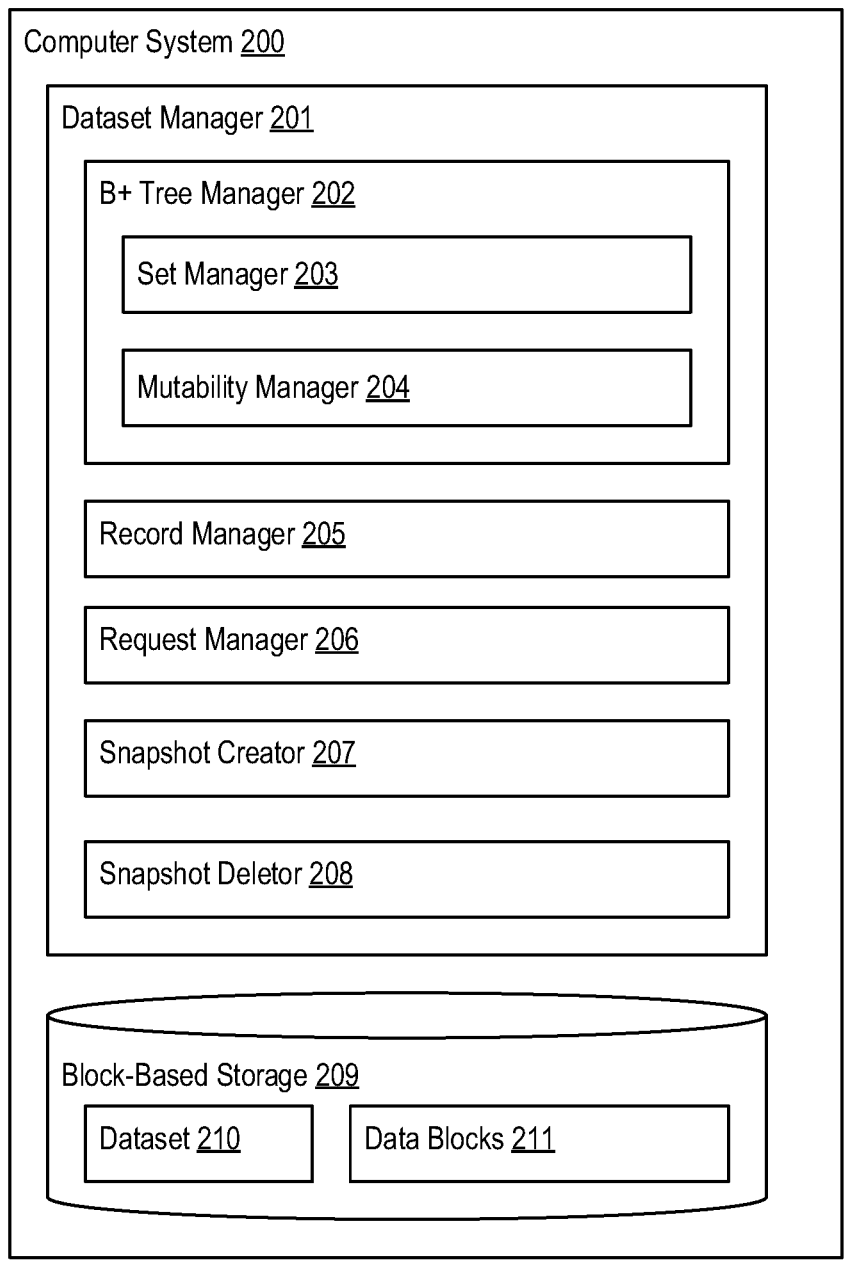
FIG. 2 illustrates an example computer architecture for managing snapshotting of a dataset using an ordered set of B+ trees.

FIG. 2 illustrates an example computer system 200 for managing snapshotting of a dataset using an ordered set of B+ trees. As shown, example computer system 200 includes a dataset manager 201 and block-based storage 209 (e.g., a physical or logical storage device). In computer system 200, block-based storage 209 includes physical or logical storage blocks 211 that are referenced/organized by a dataset 210 which in embodiments corresponds to, or includes, filesystem and/or volume metadata that organizes blocks 211 into pools, volumes, datasets, files, and the like. In computer system 200, the dataset manager 201 manages this dataset 210—including managing snapshots of the dataset 210—using dataset manager 201. It is noted that while, in example computer system 200, dataset 210 refences/organizes storage blocks in block-based storage, this is for illustrative purposes only. As will be understood by one of ordinary skill in the art, the principles of the dataset manager 201 that are described herein can be applied to a broad variety dataset types and uses beyond block-based storage and volume/filesystems.

In example computer system 200 the dataset manager 201 comprises a variety of sub-components (e.g., a B+ tree manager 202, a record manager 205, a request manager 206, a snapshot creator 207, a snapshot deletor 208, etc.) that embodiments of the dataset manager 201 use when managing dataset 210. The depicted components of the dataset manager 201, together with any sub-components thereof, represent various functions that the dataset manager 201 implements or utilizes in accordance with some embodiments described herein. It will be appreciated, however, that the depicted components—including their identity, sub-components, and arrangement—are presented merely as an aid in describing these embodiments, and that these components are non-limiting to how software and/or hardware implement variations of the dataset manager 201, including the particular functionality thereof, without exceeding or departing from the scope of the present disclosure.

In general, the B+ tree manager 202 (tree manager 202) includes a set manager 203 that manages an ordered set of B+ trees that represent dataset 210, including representing snapshots of dataset 210. As will be explained in more detail later, B+ trees within an ordered set of B+ trees are either mutable or immutable. Thus, the tree manager 202 is also shown as including a mutability manager 204. In embodiments, dataset 210 comprises a plurality of records, each of which comprises a mapping between a key and a corresponding value, or between a range of keys and a corresponding range of values. The record manager 205 manages storing of these records within leaf nodes in the ordered set of B+ trees managed by the set manager 203. The request manager 206 manages key-based requests (e.g., queries, write requests, read requests, etc.) using the ordered set of B+ trees (e.g., based on a requested key), such as, for example, identifying a key-value mapping if there is a record overlapping with a requested key. The snapshot creator 201 and the snapshot deletor 208 mange the creation of and deletion of snapshots of dataset 210, including managing creation, merging, and/or deletion of corresponding B+ trees within the ordered set of B+ trees managed by the set manager 203.

Figure 3:
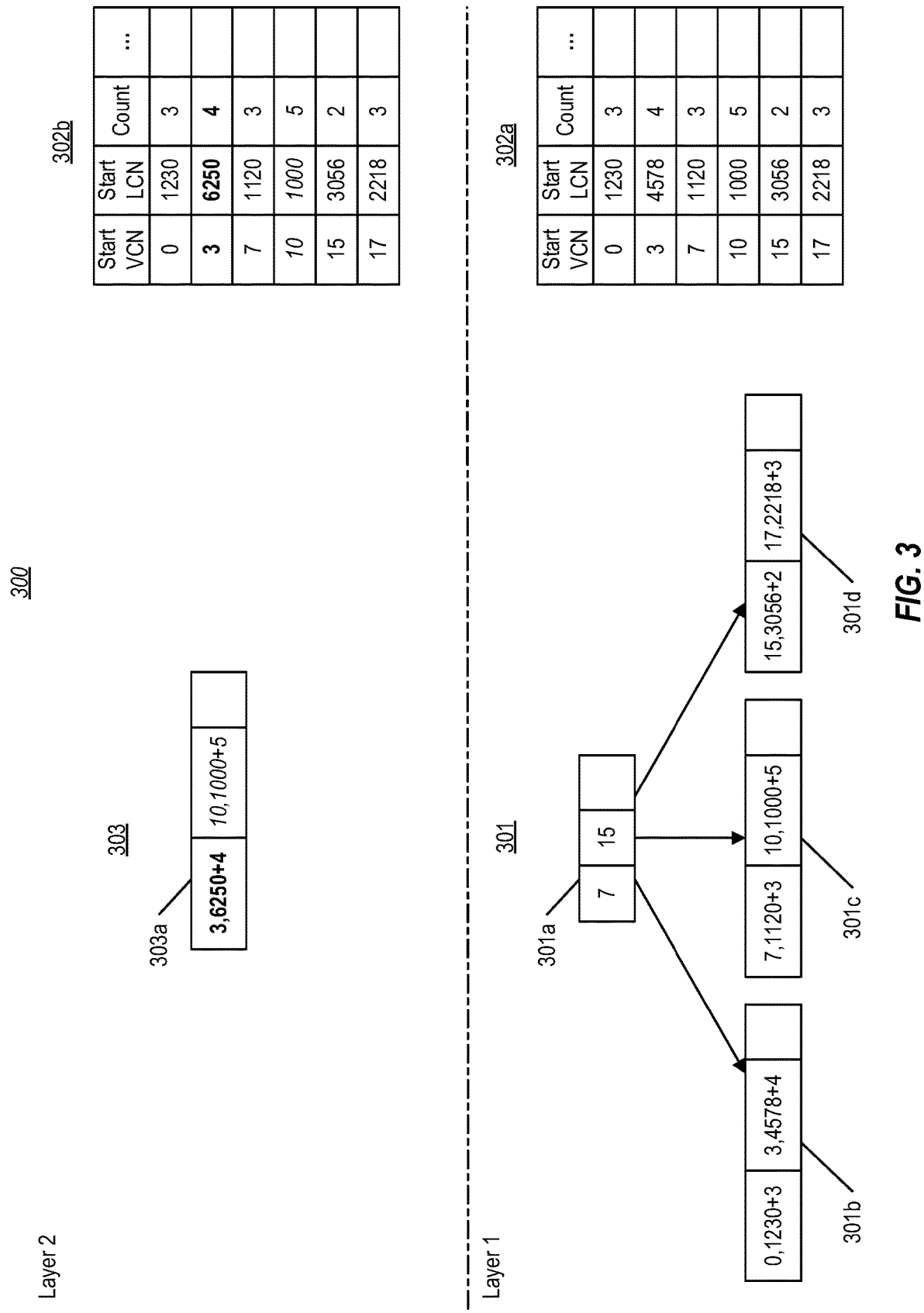
FIG. 3 illustrates an ordered set of B+ trees that represents a dataset, including snapshots of the dataset.

FIG. 3 illustrates an example 300 of an ordered set of B+ trees that represents a dataset, including snapshots of the dataset. In particular, example 300 illustrates a first B+ tree 301 logically arranged in a first layer, labeled "Layer 1." This first B+ tree 301 represents the data shown in table 302a, which in the example 300 maps ranges of Virtual Cluster Numbers (VCNs) to ranges of Logical Cluster Numbers (LCNs) within block storage (e.g., block-based storage 209). Thus, in example 300, table 302a represents one state of VCN to LCN mappings of a file. In particular, table 302a includes at least three columns corresponding to a start VCN, a start LCN, and a count which, when taken together, map a range of one or more VCNs to a corresponding range of one or more VCNs (e.g., VCN 0-2 to LCN 1230-1232, VCN 3-6 to LCN 4578-4581, etc.). As indicated by an additional column headed with ellipses, in some examples table 302a (and, correspondingly, each record represented by B+ tree 301) includes additional information, such as a checksum of data stored within the corresponding range of LCNs).

In example 300, B+ tree 301 includes four nodes, including a root node 301a and three leaf nodes 301b-301d. Leaf node 301b stores two records—a first mapping the value 0 to the value 1230 with a count of 3 (i.e., the first row in table 302a), and a second mapping the value 3 to the value 4578 with a count of 4 (i.e., the second row in table 302a); leaf node 301b also stores two records—a first mapping the value 7 to the value 1120 with a count of 3 (i.e., the third row in table 302a), and a second mapping the value 10 to the value 1000 with a count of 5 (i.e., the fourth row in table 302a); leaf node 301d also stores two records—a first mapping the value 15 to the value 3056 with a count of 2 (i.e., the fifth row in table 302a), and a second mapping the value 17 to the value 2218 with a count of 3 (i.e., the sixth row in table 302a). In embodiments, each leaf node corresponds to a page, and each page has a key range corresponding records that are covered, or which could be covered, by its corresponding leaf node. For example, leaf node 301*b* corresponds to a page covering keys 0-6, leaf node 301*c* corresponds to a page covering keys 7-15, and leaf node 301*d* corresponds to page covering keys 15 to some maximum (e.g., infinity, or some value derived from filesystem properties such as maximum file size, maximum volume size, etc.).

If only Layer 1 and B+ tree 301 were to exist in example 300, in some embodiments this first B+ tree 301 is mutable and is the only B+ tree in an ordered set of B+ trees representing the file mapped by table 302*a*. Thus, any modification(s) to the rows of table 302*a* are made directly within B+ tree 301 via the addition, removal, and/or modification of nodes in B+ tree 301. For example, VCN-LCN mapping(s) are added, removed, and/or deleted via one or more of (i) the addition, removal, or modification of records within leaf nodes 310*n*-301*d*, (ii) the deletion of one or more of leaf nodes 310*n*-301*d*, and/or (iii) the addition of one or more new leaf nodes.

However, example 300, the first B+ tree 301 has been made immutable, and an additional mutable second B+ tree 303 has been logically arranged above the first B+ tree 301 within a second layer, labeled "Layer 2." Since the first B+ tree 301 is now immutable, table 302*a* is now a "snapshot" of the VCN to LCN mapping state of the represented file. The second B+ tree 303, on the other hand, represents the "current" state of the file. As shown, the second tree 303 includes a single root node 303*a* (or a single page covering all possible keys) that includes two records—a first record mapping the value 3 to the value 6250 with a count of 4, and a second record mapping the value 10 to the value 1000 with a count of 5. When these records within the second B+ tree 303 are layered on top of the records within the first B+ tree 301, the combination of B+ trees represent table 302*b*.

The second row of table 302*b* is shown in bold to indicate that the first record in tree 303 (also bolded) has modified that row. In embodiments, the second row represents a change to the file's data. In an example, after creation of tree 303, there was a request to write to at least one of VCNs 3-6; as a result, the write was performed on LCNs 6250-6253 (potentially after first copying LCNs 4578-4581 to LCNs 6250-6253 on a copy-on-write operation), and the bolded first record (i.e., 3,6250+4) recording the mapping from VCNs 3-6 to LCNs 6250-6253 was added to B+ tree 301. In this way, the "current" version of the file reflects the write, but the prior "snapshot" version of the file represented by tree 301 and table 302*a* is preserved. In embodiments, and as will be more explained in more detail later, this bolded first record in tree 303 is a strong reference, since it is independent of the mappings in tree 301. The fourth row of table 302*b* is shown in italics to indicate that second record in tree 303 (also italicized) overlaps with that row but does not modify it. In embodiments, this italicized second record was added to tree 303 based on a query on VCN 10 after creation of tree 303, but there have been no writes requested to any VCNs covered by the mapping. In embodiments, and as will be more explained in more detail later, this italicized second record in tree 303 is a weak reference, since refers to a mapping in tree 301.

Figure 4A:
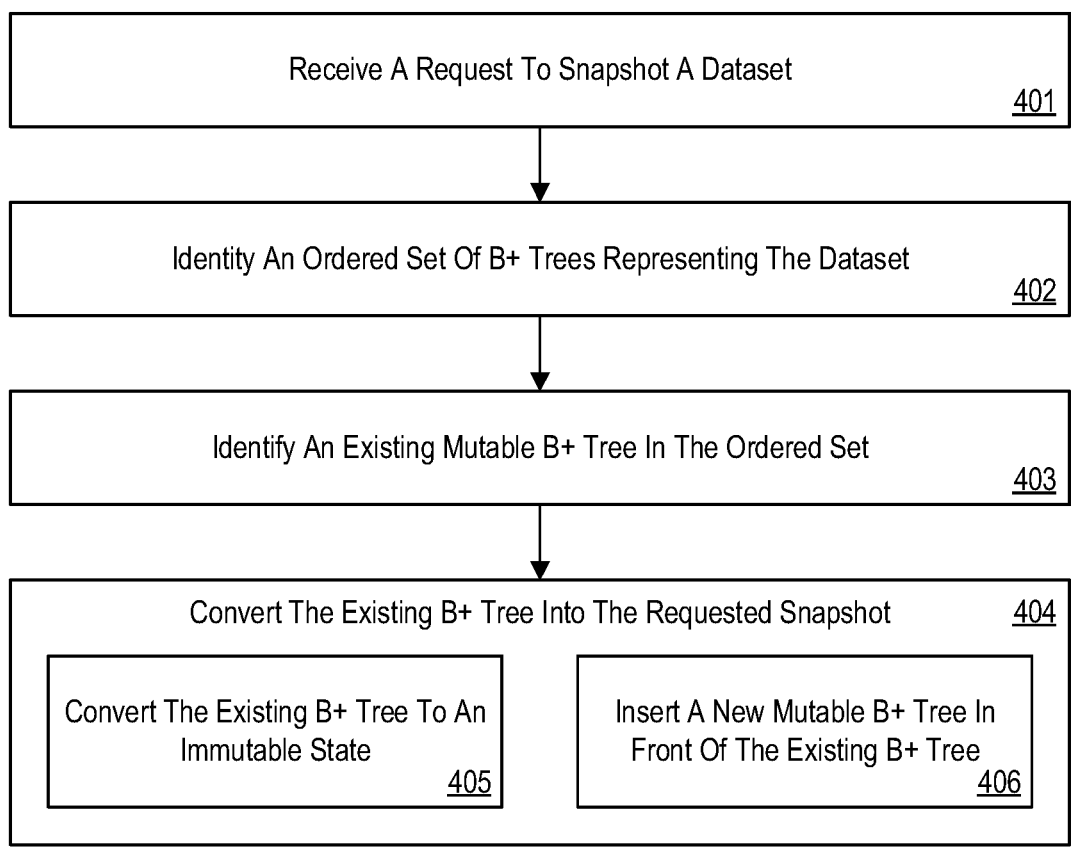
FIG. 4A illustrates a flow chart of an example method for creating a snapshot of a dataset using an ordered set of B+ trees representing the dataset.
Figure 4B:
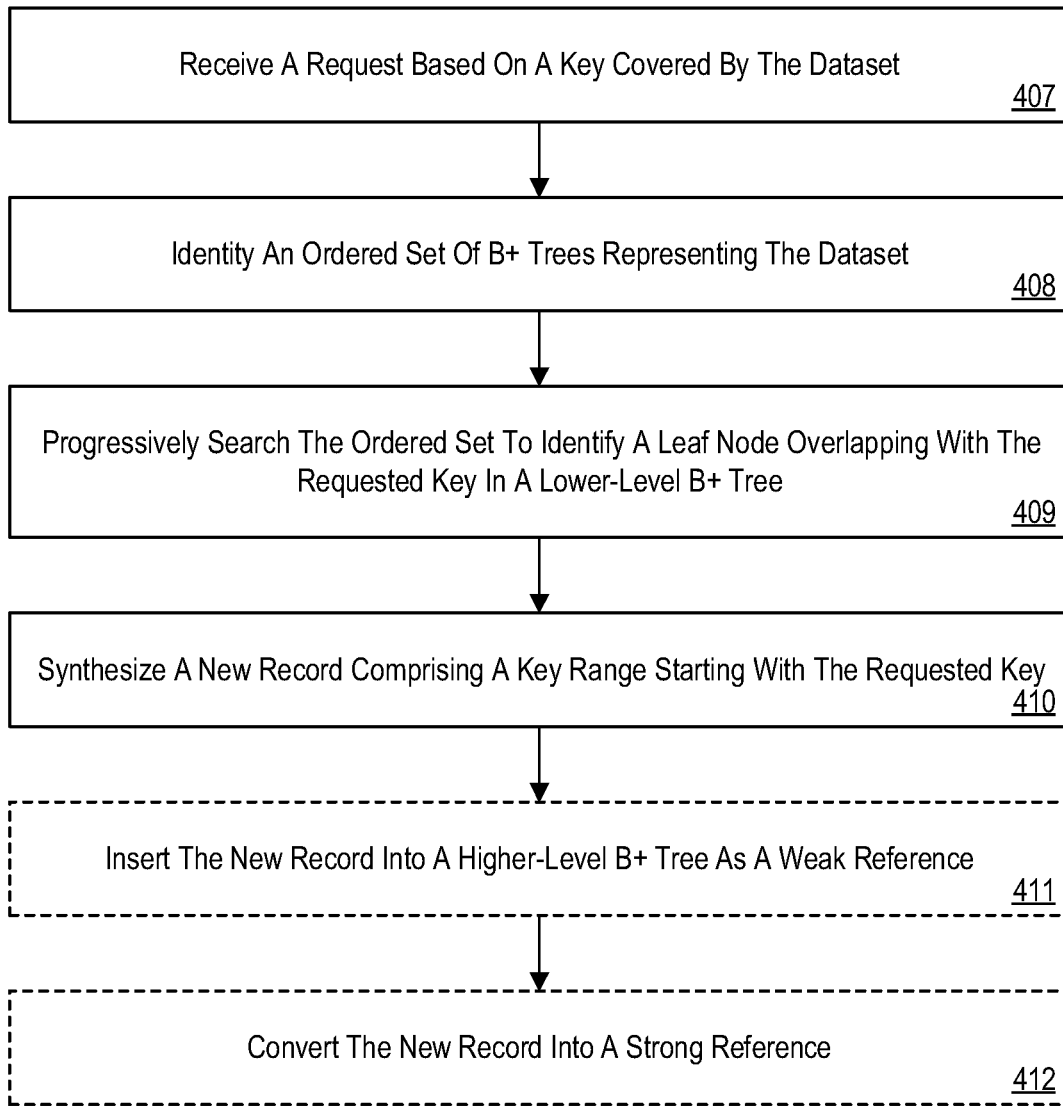
FIG. 4B illustrates a flow chart of an example method for processing a key-based request on a snapshotted dataset using an ordered set of B+ trees representing the dataset.
Figure 4C:
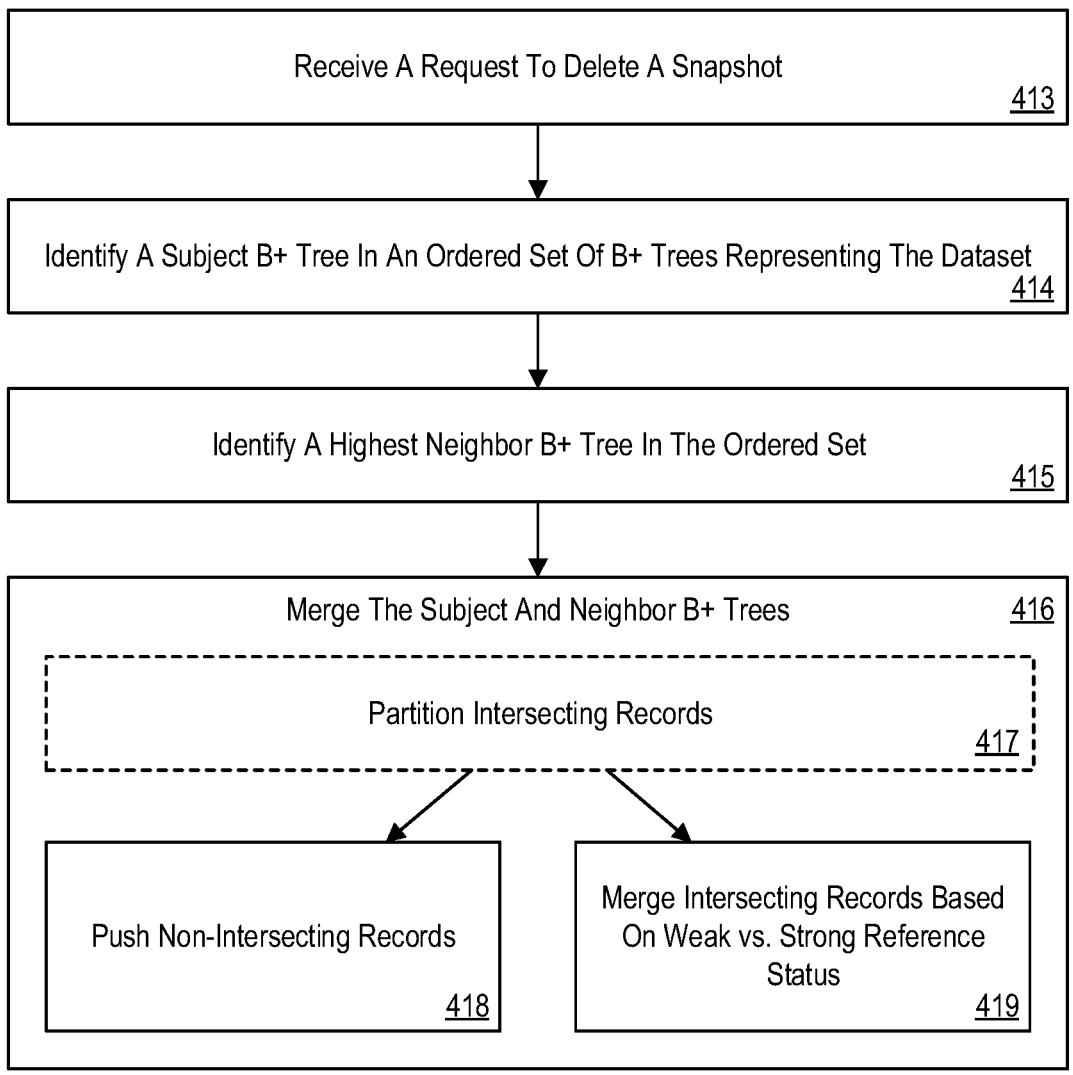
FIG. 4C illustrates a flow chart of an example method for deleting a snapshot of a dataset using an ordered set of B+ trees representing the dataset.

With this context in place, a more particular description of the dataset manager 201 is now provided, primarily in connection with FIGS. 4A-4C. In general, FIGS. 4A-4C provide flowcharts of that are part of an overall method 400 for managing snapshotting of a dataset using an ordered set of B+ trees representing the dataset. More particularly, however, FIG. 4A illustrates an example of a method 400*a* for creating a snapshot of a dataset using an ordered set of B+ trees representing the dataset; FIG. 4B illustrates an example of a method 400*b* for processing a key-based request on a snapshotted dataset using an ordered set of B+ trees representing the dataset; and FIG. 4C illustrates an example of a method 400*c* for deleting a snapshot of a dataset using an ordered set of B+ trees representing the dataset. As will be appreciated in various embodiments, methods 400*a*, 400*b*, and 400*c* are capable of being implemented either individually or in any combination. The following discussion refers to a number of methods and method acts. Although the method acts may be discussed in a certain order, or may be illustrated in a flow chart as occurring in a particular order, no particular ordering is required unless specifically stated, or required because an act is specifically described as being dependent on another act being completed prior to the act being performed.

As mentioned, FIG. 4A illustrates a flowchart of an example method 400*a* for creating a snapshot of a dataset using an ordered set of B+ trees representing the dataset. As shown in FIG. 4A, based on an act 401 of receiving a request to snapshot a dataset, method 400*a* includes an act 402 of identifying an ordered set of B+ trees representing the dataset. In an example, the snapshot creator 207 receives a request to snapshot a dataset, and calls the tree manager 202 to identify an ordered set of B+ trees. In some embodiments, act 402 comprises, based at least on receiving a request to create a snapshot of the dataset, identifying the ordered set of B+ trees, each leaf node within each B+ tree in the ordered set of B+ trees representing a corresponding page key range and storing zero or more records for the corresponding key range, and a corresponding range of resources mapped thereto, that falls within the corresponding page key range. To illustrate, FIG. 5A shows an example 500*a* of a dataset that is represented by an ordered set of three B+ trees. The dataset of example 500*a* maps sets of one or more keys comprising VCNs of a file to sets of one or more resources comprising LCNs of a block storage device. Example 500*a* shows that there are three logical layers in the dataset, each corresponding to a different B+ tree the ordered set of three B+ trees. Thus, in an example, in act 402 the set manager 203 identifies this ordered set of three B+ trees (e.g., based on a request from the snapshot creator 207).

In example 500*a*, the bottommost layer, labeled "Snap 1," corresponds to an immutable first B+ tree that represents an oldest snapshot of the file. The Snap 1 layer includes a record 501*a* mapping VCNs 0-600 to LCNs 200-800; record 501*a* is shown in solid lines to indicate that is a strong reference (i.e., the mapping of VCNs 300-600 in record 501*a* is independent of any low-layer record). In one example, this first B+ tree is a single-node B+ tree that represents a single page covering the entire range of VCNs. In example 500*a*, the next layer up, labeled "Snap 2," corresponds to an immutable second B+ tree, ordered in front of the first B+ tree in the ordered set, that represents a most recent snapshot of the file. The Snap 2 layer includes a record 501*b* mapping VCNs 300-600 to LCNs 1000-1300; record 501*b* is shown in solid lines to indicate that is a strong reference (i.e., the mapping of VCNs 300-600 in record 501*b* is independent of any low-layer record). In one example, this second B+ tree is also a single-node B+ tree that represents a single page covering the entire range of VCNs. In example 500*a*, the topmost layer, labeled "Current," corresponds to a mutable third B+ tree, ordered in front of the second B+ tree in the ordered set, that represents a current state of the file. The Current layer includes a first record 501*c* mapping VCNs 0-100 to LCNs 0-100 and a second record 501d mapping VCNs 340-560 to LCNs 1040-1260; record 501c is shown in solid lines to indicate that is a strong reference (i.e., the mapping of VCNs 0-100 in record 501c is independent of any low-layer record), while record 501d is shown in broken lines to indicate that is a weak reference (i.e., the mapping of VCNs 340-560 in record 501d is dependent on a low-layer record). In one example, this third B+ tree includes at least two leaf nodes and thus two pages. Although example 500a does not show all page boundaries, example 500a does show one page boundary 502, which indicates that that the page key range covered by the node/page to which record 501c belongs has a maximum of 200.

After act 402, method 400a proceeds to an act 403 of identifying an existing mutable B+ tree in the ordered set. In some embodiments, act 403 comprises identifying an existing B+ tree within the ordered set of B+ trees, the existing B+ tree being mutable and being a beginning B+ tree in the ordered set of B+ trees. In the context of example 500a, for instance, the set manager 203 selects the third B+ tree which, as discussed, is mutable and is positioned in front of the other B+ trees in the ordered set. Notably, in embodiments, the beginning B+ tree in the ordered set of B+ trees may not be the first B+ tree in the ordered set of B+ trees. In these embodiments, the term "the beginning B+ tree" refers to a B+ tree corresponding to a layer where all B+ trees "behind" the beginning B+ tree (i.e. corresponding to layers that are all "below" the layer corresponding to the beginning B+ tree) are immutable.

Figure 5B:
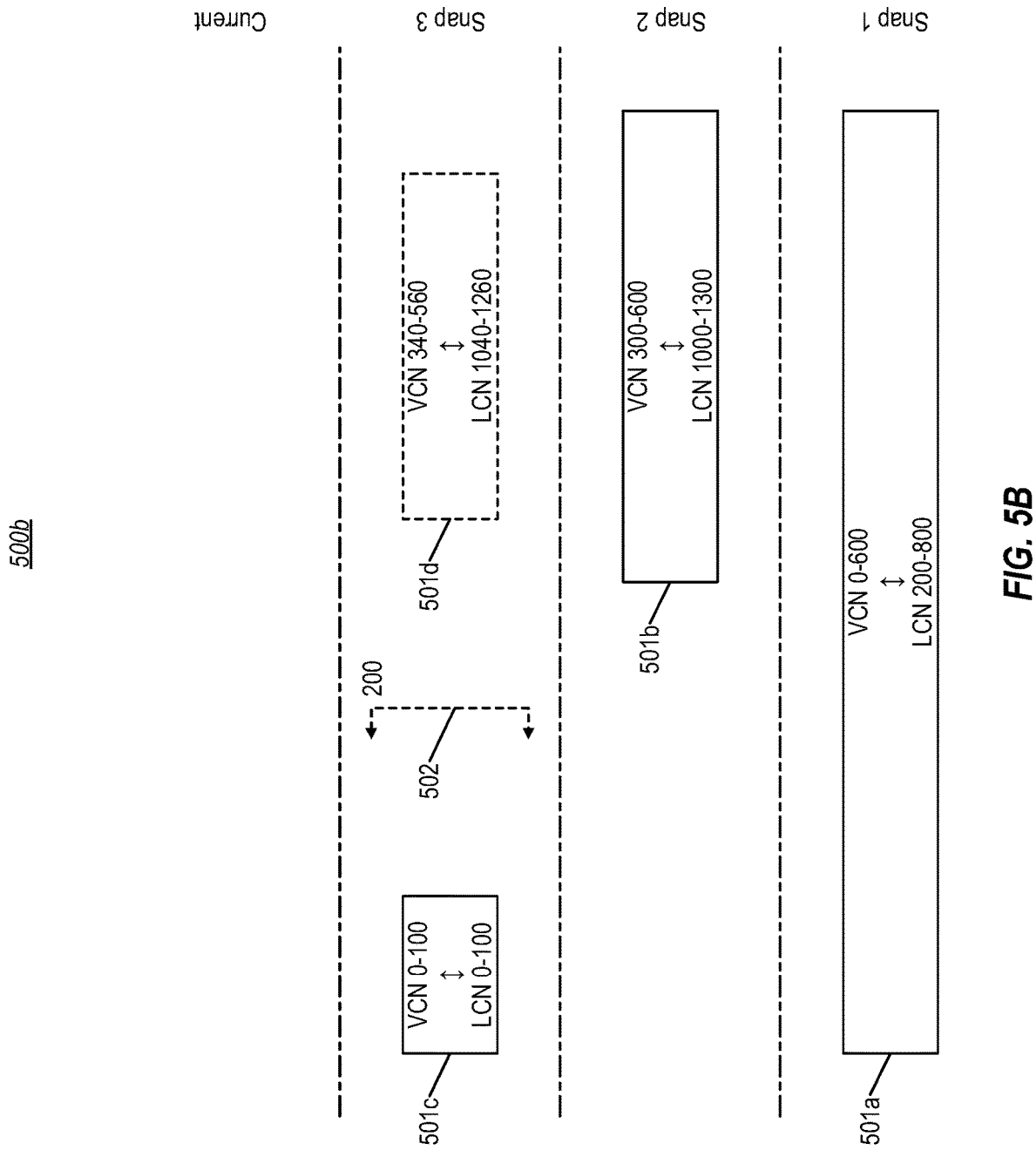
FIG. 5B illustrates an example of the dataset of FIG. 5A, which is now represented by an ordered set that includes a new empty B+ tree.

After act 403, method 400a proceeds to an act 404 of converting the existing B+ tree into the requested snapshot. As shown, converting the existing B+ tree into the requested snapshot includes an act 405 of converting the existing B+ tree to an immutable state, and an act 406 of inserting a new mutable B+ tree in front of the existing B+ tree. Various embodiments perform acts 405 and 406 either parallelly or serially (in either order). In some embodiments, act 405 comprises converting the existing B+ tree to an immutable state, the existing B+ tree corresponding to the requested snapshot of the dataset. In some embodiments, act 406 comprises inserting a new B+ tree in front of the existing B+ tree in the ordered set of B+ trees to become the beginning B+ tree in the ordered set of B+ trees, the new B+ tree being empty and mutable. To illustrate acts 405 and 406, FIG. 5B shows an example 500b of the dataset of FIG. 5A, which is now represented by an ordered set that includes a new empty B+ tree. Example 500b now shows a new topmost layer. In example 500b, this new topmost layer corresponds to a new an empty mutable fourth B+ tree, ordered in front of the third B+ tree in the ordered set, that represents the current state of the file. Thus, this new topmost layer is labeled "Current." In example 500b, the third B+ tree has now become immutable and thus now represents a most recent snapshot of the file, rather than the current state of the file as it did previously. Thus, that layer is now labeled, "Snap 3." For example, based on a request from the snapshot creator 207, the mutability manager 204 has converted the third B+ tree from a mutable state to an immutable state, and the set manager 203 has created the new empty mutable fourth B+ tree.

Figure 5C:
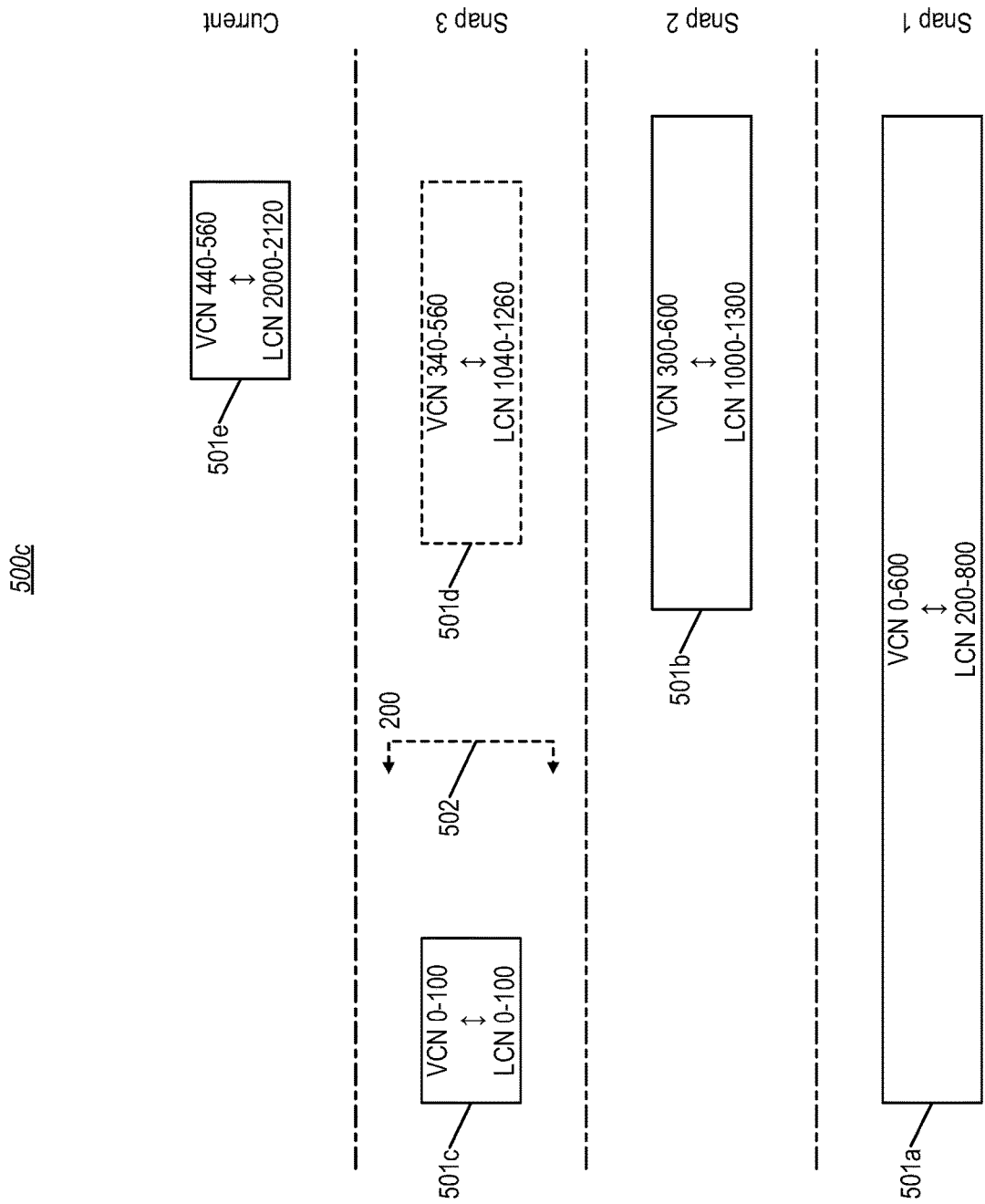
FIG. 5C illustrates an example of the dataset of FIG. 5B, in which a record has been inserted into the new B+ tree.

While this new fourth B+ tree represents the current state of the file, any changes to VCN to LCN mappings are made within the fourth B+ tree. To illustrate, FIG. 5C shows an example 500c in which the record manager 205 has inserted a new record in the fourth B+ tree. In particular, example 500c shows that the Current layer now includes a new record 501e mapping VCNs 440-560 to LCNs 2000-2120; record 501e is shown in solid lines to indicate that is a strong reference (i.e., the mapping of VCNs 440-560 in record 501e is independent of any low-layer record).

In order to provide a further understanding of the use and modification of ordered sets of B+ trees representing datasets, FIG. 4B now illustrates a flowchart of an example method 400b for processing a key-based request on a snapshotted dataset using an ordered set of B+ trees representing the dataset. While some embodiments perform method 400b independently of method 400a, some embodiments perform method 400b as an extension of method 400a. Thus, in some embodiments acts 407-412 of method 400b are independent of acts 401-406 of method 400a, while in other embodiments acts 407-412 of method 400b are performed after acts 401-406 of method 400a.

As shown in FIG. 4B, based on an act 407 of receiving a request based on a key covered by the dataset, method 400a includes an act 408 of identifying an ordered set of B+ trees representing the dataset. In an example, the request manager 206 receives a request to locate a requested key in a dataset, and calls the tree manager 202 to identify an ordered set of B+ trees. In some embodiments, act 408 comprises, based at least on a request that includes a requested key, identifying an ordered set of B+ trees, each leaf node within each B+ tree in the ordered set of B+ trees representing a corresponding page key range and storing zero or more records for the corresponding key range, and a corresponding range of resources mapped thereto, that falls within the corresponding page key range. In an example, method 400b occurs after inserting the new B+ tree into to the ordered set of B+ trees in act 406, and the request manager 206 receives a request for that includes the requested key. As a result, the request manager 206 causes the set manager 203 to identify the ordered set of four B+ trees representing the dataset shown in FIG. 5C.

Figure 5D:
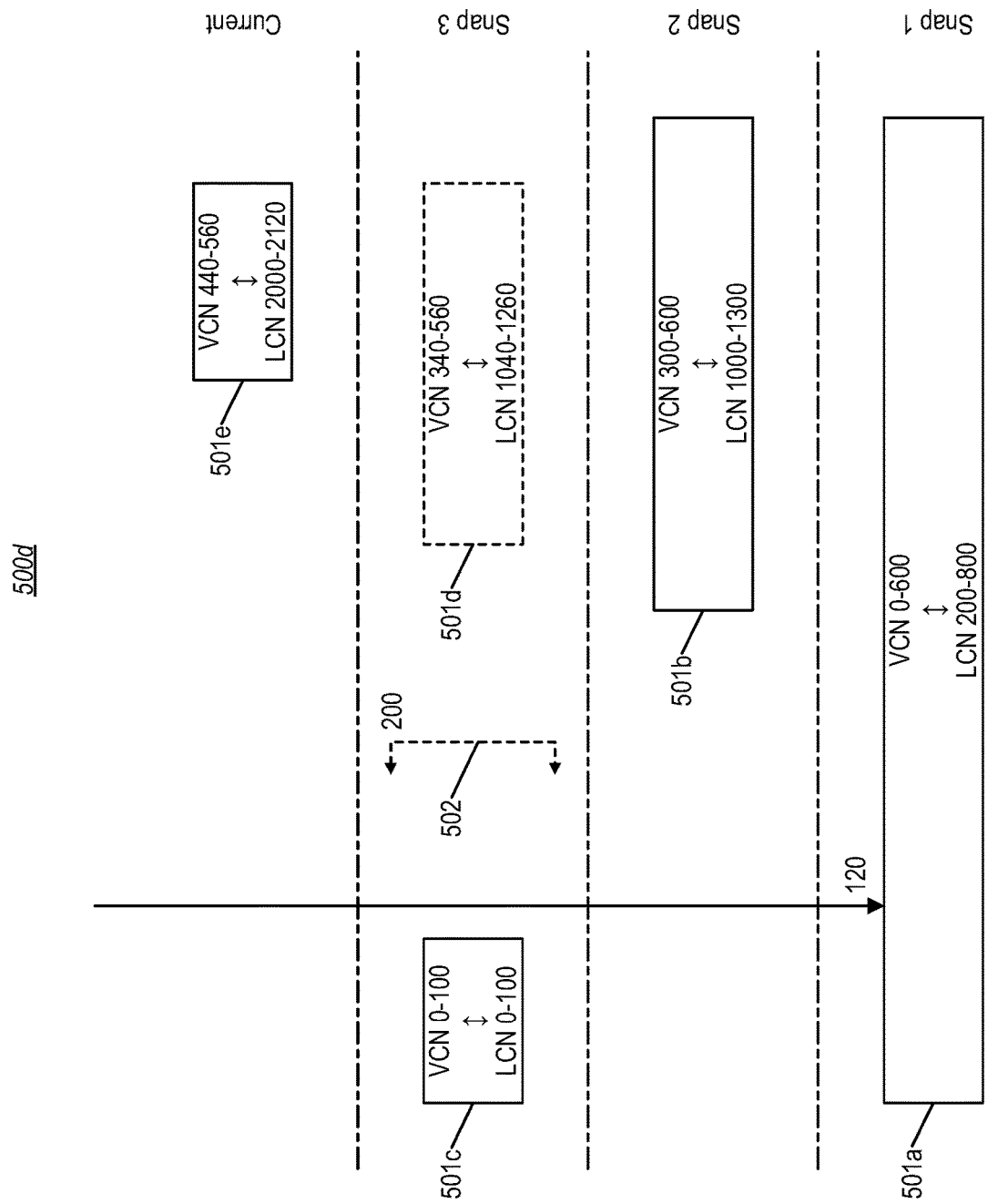
FIG. 5D illustrates an example of progressively searching the dataset of FIG. 5C for a requested key.

After act 408, method 400b proceeds to an act 409 of progressively searching the ordered set to identify a leaf node overlapping with the requested key in a lower-level B+ tree. In some embodiments, act 409 comprises, starting with a beginning B+ tree, progressively searching each B+ tree in the ordered set of B+ trees, until a particular B+ tree is identified that includes a particular leaf node storing a particular record for the particular key range that overlaps with the requested key. In an example, the request manager 206 searches through each B+ tree, in order, until it encounters a B+ tree storing a record that overlaps with the requested key. To illustrate, FIG. 5D shows an example 500d of progressively searching the dataset of FIG. 5C for the requested key 120. In example 500d, this search is represented by a downward arrow that begins at the Current layer (i.e., the fourth B+ tree) and extends to the Snap 1 layer (i.e., the first B+ tree). In example 500d, none of the fourth, third, or second B+ trees store a record overlapping with key 120, so the search extends all the way to the fourth B+ tree, where record 501a (corresponding to keys 0-600) is encountered. However, if an overlapping record has been encountered in one of the fourth, third, or second B+ trees, the search would have ended at that B+ tree. For instance, a search for key 320 would have ended at the third B+ tree (i.e., record 501d).

While, in example 500d, the search began at the topmost layer (i.e., the fourth B+ tree), in some embodiments it is possible for a search to begin at any layer. In example 500d a request was initiated based on the current state of the file, and thus the search began with the fourth B+ tree. However, some embodiments permit requests to be initiated based on a specified snapshot. Thus, for example, the search could have begun at the third, second, or first B+ trees, depending on which snapshot was specified for the request.

After act 409, method 400*b* proceeds to an act 410 of synthesizing a new record comprising a key range starting with the requested key. In some embodiments, act 410 comprises synthesizing a new record, the new record corresponding to a key range, and a range of resources mapped thereto, that starts with the requested key and that includes at least a subset of the particular key range. For example, the record manager 205 synthesizes a new record comprising a key range that starts with the requested key of 120.

In some embodiments, the record manager 205 identifies the key range of the synthesized record based at least on a count (or offset) from the requested key. In some embodiments, the record manager 205 calculates the count so that the key range of the synthesized record does not overlap with any record(s) in any upper-level B+ tree(s) that store records mapping key ranges greater in value than the requested key. For instance, in FIG. 5D record 501*b* in the second B+ tree, record 501*d* in the third B+ tree, and record 501*e* in the fourth B+ tree each map key ranges (i.e., 300-600, 340-560, and 440-560) that overlap with record 501*a* and that are greater than requested key 120. Choosing a count that creates a key range that is less than smallest beginning key of ranges 300-600, 340-560, and 440-560 (i.e., key 300) would ensure that the synthesized record does not overlap with any of records 501*b*, 501*d*, and 501*e*. Thus, in some embodiments, the record manager 205 determines the count based at least on choosing a smallest beginning key of one or more key ranges that intersect with the particular key range, the one or more key ranges corresponding to one or more records stored in one or more first B+ trees that are prior to the particular B+ tree in the ordered set of B+ trees. In this case, a count of 179 would create a synthesized record having the range 120-299, which would not overlap with any record(s) in any upper-level B+ tree(s).

However, in some embodiments, the count is also calculated so as to not exceed any known maximum page key range known in the upper-level B+ tree(s). For example, due to the manner in which B+ trees are traversed during a search, it is possible that, at the time of the search, nothing beyond key 200 (page boundary 502) is known within the third B+ tree (Snap 3). Thus, the presence of record 501*d* may actually be unknown at the time of the search (i.e., because record 501*d* stored by a leaf node that was not actually encountered during the search), and it is possible that there could actually be a record in the Snap 3 layer that begins as early as key 201. Due to this uncertainty, in some embodiments the record manager 205 determines the count based at least on choosing a smallest ending key of one or more page key ranges that are represented by one or more second B+ trees that are prior to the particular B+ tree in the ordered set of B+ trees, the smallest ending key being greater than the requested key, each of the one or more page key ranges in the one or more second B+ trees lacking any record for key ranges greater than the requested key. In this case, a count of 80 would create a synthesized record having the range 120-200, which would not exceed any maximum page key range known in the upper-level B+ tree(s).

In embodiments, the record manager 205 chooses a minimal value based on known row key ranges and page key ranges in the upper-level B+ trees. Thus, in these embodiments, the record manager 205 determines the count based at least on choosing a minimum of (i) a smallest beginning key of one or more key ranges that intersect with the particular key range, the one or more key ranges corresponding to one or more records stored in one or more first B+ trees that are prior to the particular B+ tree in the ordered set of B+ trees, or (ii) a smallest ending key of one or more page key ranges that are represented by one or more second B+ trees that are prior to the particular B+ tree in the ordered set of B+ trees, the smallest ending key being greater than the requested key, each of the one or more page key ranges in the one or more second B+ trees lacking any record for key ranges greater than the requested key.

Figure 5E:
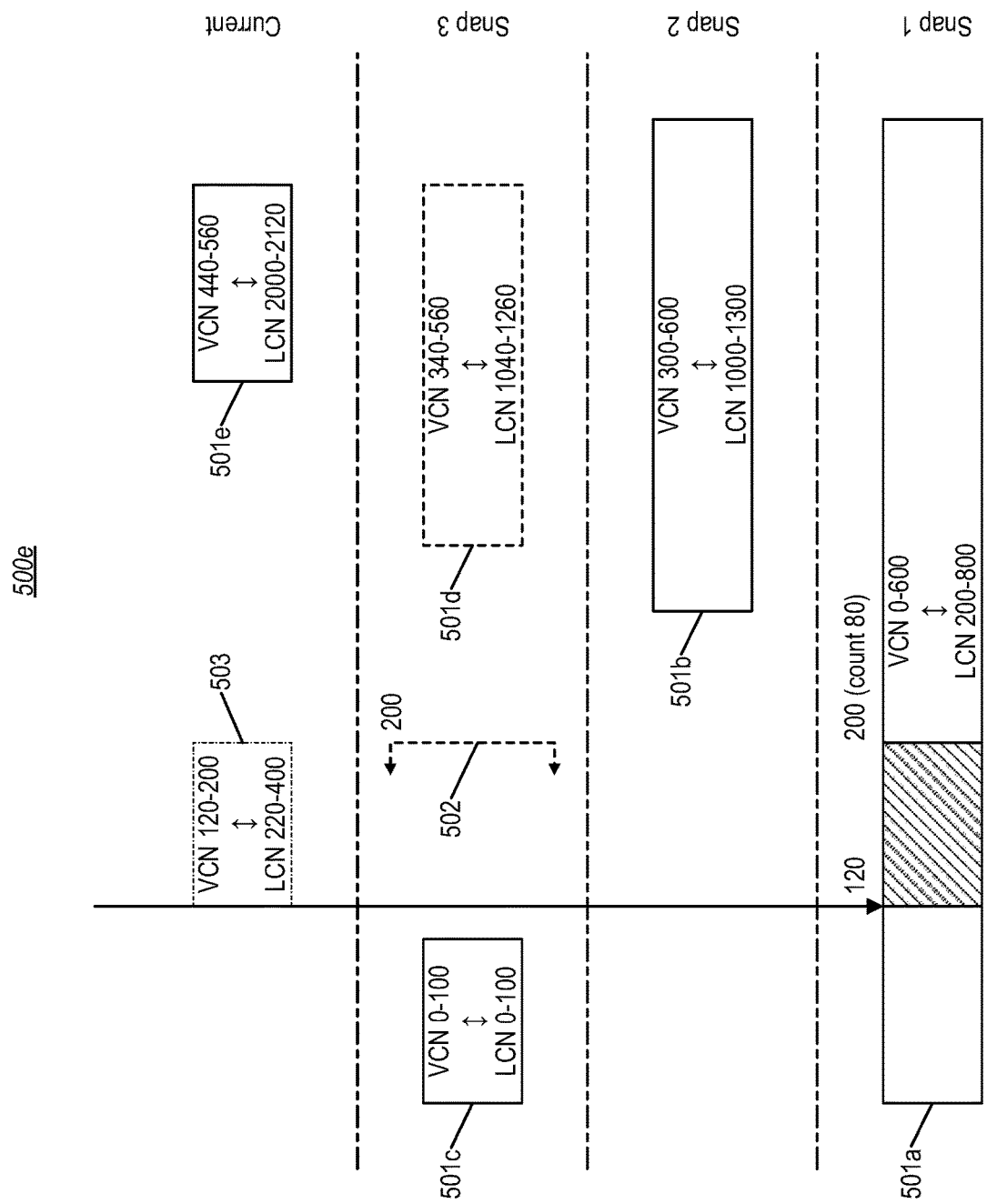
FIG. 5E illustrates an example of a synthesized record for the requested key requested in FIG. 5D.

FIG. 5E illustrates an example 500*e* an example of a synthesized record for the requested key of 120. As indicated by the shaded portion of record 501*a* the record manager 205 has identified (e.g., based on page boundary 502 having a smaller value than the beginning of record 501*b*) a count of 80 for the synthesized record, resulting in a VCN range for the synthesized record of 120-200. This synthesized record 503 is shown in the Current layer as record 503, mapping VCNs 120-200 to LCNs 220-400. Note that synthesized record 503 is shown using broken lines of varying lengths. This is to indicate that, in embodiments, the record manager 205 has not yet inserted anything into the fourth B+ tree. Instead, synthesized record 503 exists in memory apart from the fourth B+ tree. In embodiments, this the key range of synthesized record 503 is "pinned" in the Current layer, and it is therefore usable for future searches/requests, but synthesized record 503 has not yet become an actual part of fourth B+ tree. Thus, for example, if the dataset were to re-loaded from the ordered set of B+ trees (e.g., due to a system restart), synthesized record 503 would not exist.

Figure 5F:
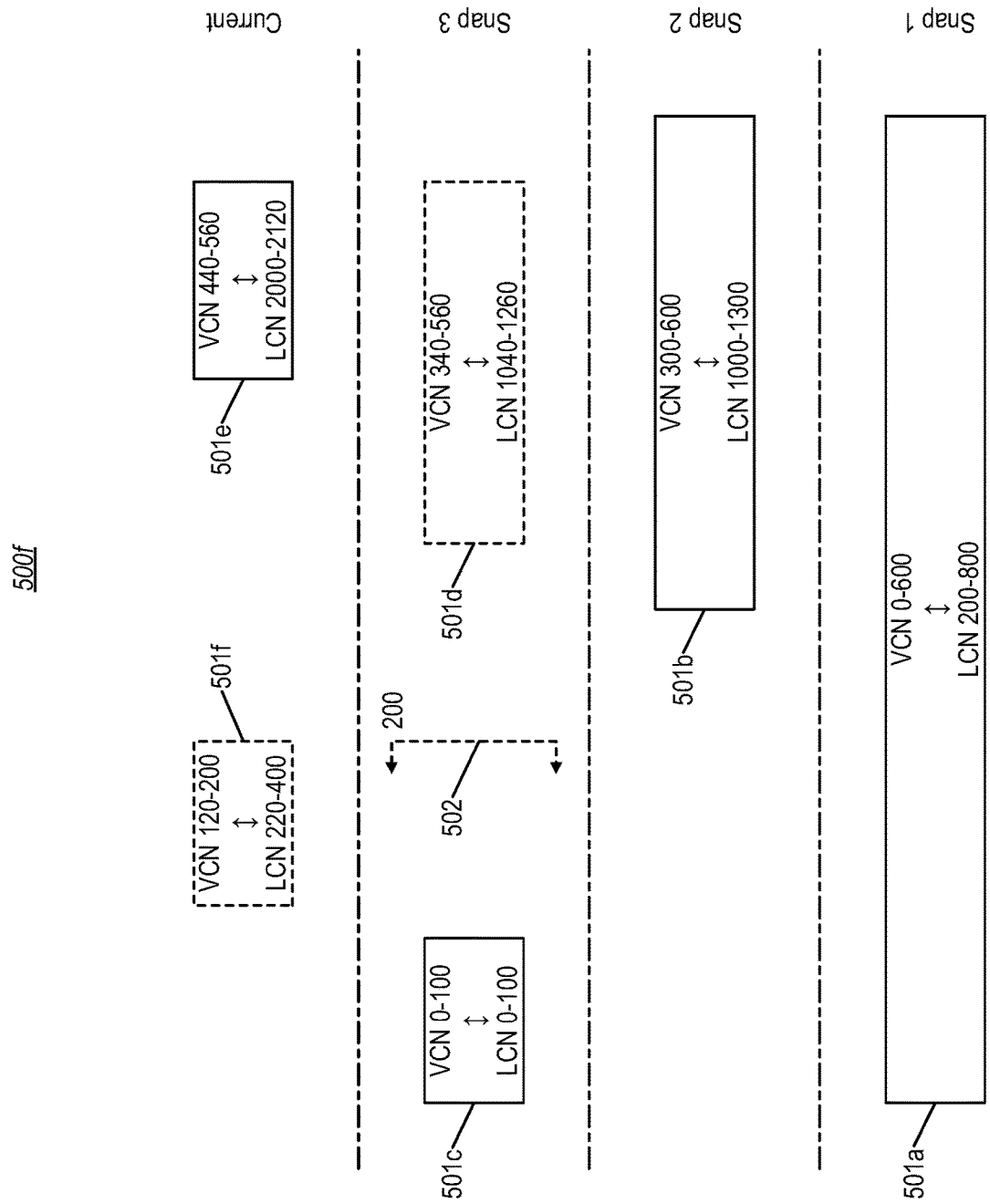
FIG. 5F illustrates an example in which the synthesized record of FIG. 5E has been inserted into the new B+ tree as a weak reference.

However, as shown in method 400*b*, some embodiments proceed to an act 411 of inserting the new record into a higher-level B+ tree as a weak reference. In some embodiments, act 411 comprises storing the new record within a leaf node of the new B+ tree, the new record being flagged as having a weak reference state that is dependent on the particular record. For example, FIG. 5F shows an example 500*f* in which the synthesized record of FIG. 5E has been inserted into the new B+ tree as a weak reference. In particular, in example 500*f*, the record manager 205 has now inserted a new record 501*f* into the Current layer, which corresponds to the prior synthesized record 503, and has flagged record 501*f* as being a weak record (i.e., because its mapping of VCNs 120-220 depend on a record in a lower layer).

Figure 5G:
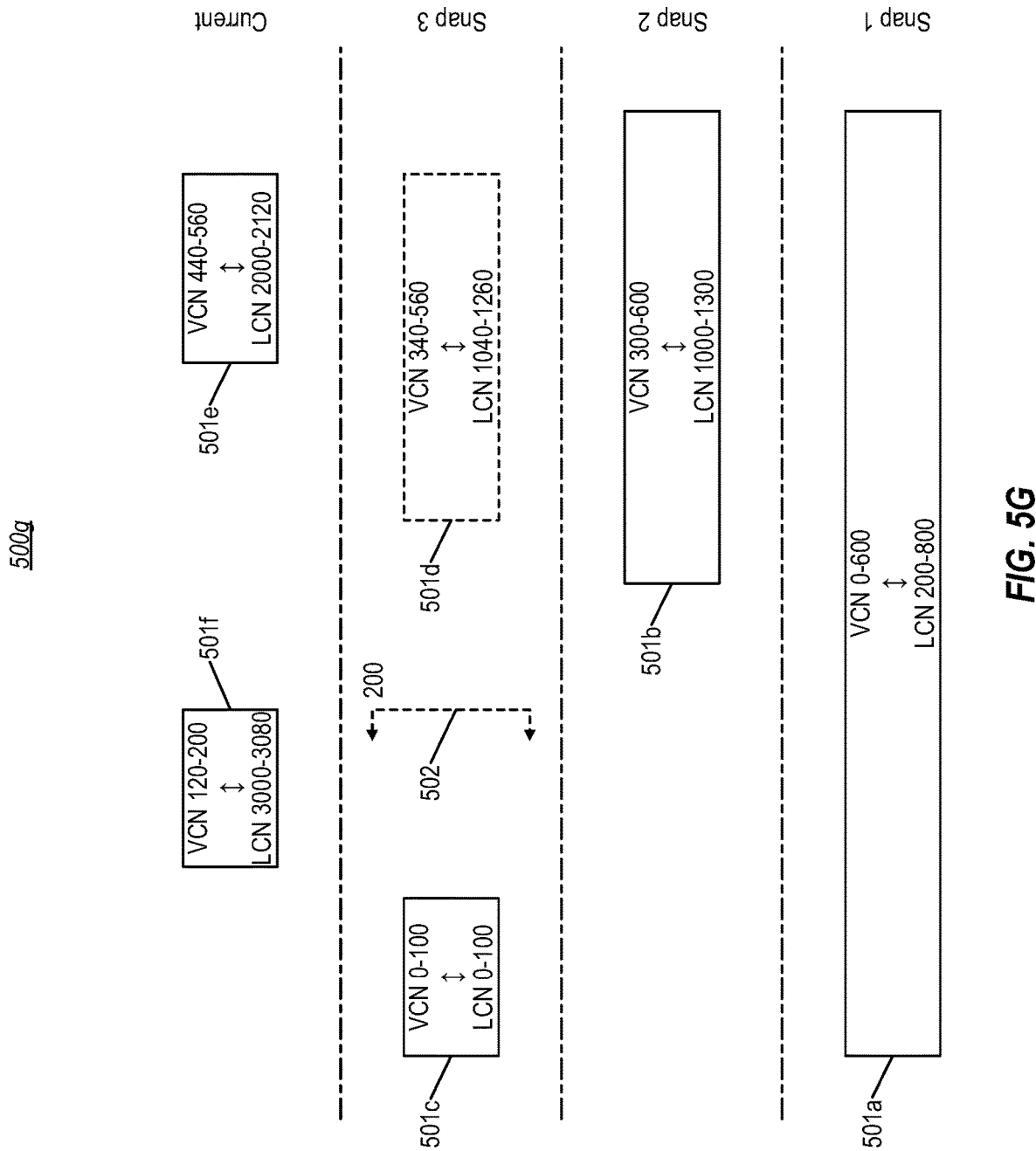
FIG. 5G illustrates an example in which the new record inserted in FIG. 5F has been converted to a strong reference.

As shown in method 400*b*, some embodiments also proceed to an act 412 of converting the new record into a strong reference. In some embodiments, act 412 comprises, subsequent to storing the new record, modifying the range of resources mapped to the key range of the new record, and based at least on modifying the range of resources mapped to the key range of the new record, flagging the new record having a strong reference state that is independent of any lower intersecting record. For example, FIG. 5G shows an example 500*g* in which the new record inserted in FIG. 5F has been converted to a strong reference. In particular, in example 500*g*, the record manager 205 has now modified the mapping of record 501*f* to point to LCNs 3000-3080 instead of LCNs 220-400 (e.g., due to a write to VCNs 120-200), and has flagged record 501*f* as being a strong record (i.e., because its mapping of VCNs 120-220 is independent of any lower layer). Notably, in alternate embodiments, method 400*b* omits act 411, and inserts new record 501*f* into the Current layer as a strong reference, rather than as a weak reference. For example, in these embodiments, method 400*b* directly inserts record 501*f* as shown in example 500*g* (having the mapping from VCNs 120-200 to LCNs 3000-

3080), and omits inserting record 501*f* as shown in example 500*f* (having the mapping from VCNs 120-200 to LCNs 220-400).

In embodiments, snapshots (including their corresponding B+ trees) are removed from an ordered set of B+ trees. In order to provide a further understanding of snapshot deletion, FIG. 4C now illustrates a flowchart of an example method 400*c* for deleting a snapshot of a dataset using an ordered set of B+ trees representing the dataset. While some embodiments perform method 400*c* independently of method 400*a* and/or method 400*b*, some embodiments perform method 400*c* as an extension of one or both of method 400*a* or method 400*b*. Thus, in some embodiments acts 413-419 of method 400*c* are independent of acts 401-406 of method 400*a* and/or acts 407-412 of method 400*b*, while in other embodiments acts 413-419 of method 400*c* are performed after one, or both, of acts 401-406 of method 400*a* or 407-412 of method 400*b*.

As shown in FIG. 4C, based on an act 413 of receiving a request to delete a snapshot, method 400*c* includes an act 414 of identifying a subject B+ tree in an ordered set of B+ trees representing the dataset. In some embodiments, act 414 comprises, based at least on receiving a request to delete an identified snapshot of the dataset, identifying a subject B+ tree in the ordered set of B+ trees that corresponds to the identified snapshot. Referring to FIG. 5G, in an example the snapshot deletor 208 receives a request to delete the snapshot corresponding to Snap 3. Thus, using the set manager 203, the snapshot deletor 208 identifies the third B+ tree in the ordered set of B+ trees.

After act 414, method 400*c* proceeds to an act 415 of identifying a highest neighbor B+ tree in the ordered set. In some embodiments, act 415 comprises identifying a neighbor B+ tree that precedes the subject B+ tree in the ordered set of B+ trees. Referring to FIG. 5G, in an example, using the set manager 203, the snapshot deletor 208 identifies the fourth B+ tree in the ordered set of B+ trees, corresponding to the Current layer. Notably, the third B+ has two neighbors: the fourth B+ tree (the Current layer) and the second B+ tree (the Snap 3 layer). The fourth B+ tree is the "highest" of these neighbors because it corresponds to a "higher" layer, and because it is ordered prior to the third B+ tree in the ordered set. The snapshot deletor 208 identifies the "highest" neighbor because, in embodiments, deletion of the snapshot corresponding to the Snap 3 layer should not affect any snapshots "below" that snapshot.

After act 415, method 400*c* proceeds to an act 416 of merging the subject and neighbor B+ trees. In some embodiments, act 416 comprises merging the neighbor B+ tree and the subject B+ tree. Referring to FIG. 5G, in an example, the snapshot deletor 208 deletes the snapshot corresponding to the Snap 3 layer by, at least logically, merging the records in the fourth B+ tree with the records in the third B+ tree, and deleting the third B+ tree.

As just mentioned, the snapshot deletor 208 at least logically merges the records in the fourth B+ tree with the records in the third B+ tree, and deletes the third B+ tree. In some embodiments, however, it may actually be the fourth B+ tree that is deleted. In embodiments, whether the third B+ tree or the fourth B+ tree is deleted depends on merge direction. In some embodiments, the merging in act 416 is accomplished by merging the records of the third B+ tree "up" into the fourth B+ tree, and deleting the third B+ tree. Thus, in some embodiments, act 416 comprises merging one or more records of the subject B+ tree into the neighbor B+ tree, and deleting the subject B+ tree from the ordered set of B+ trees. In other embodiments, the merging in act 416 is accomplished by merging the records of the fourth B+ tree "down" into the third B+ tree, applying an identification of the fourth B+ tree (e.g., a snapshot identifier) to the third B+ tree, and deleting the fourth B+ tree. If the fourth B+ tree was mutable, merging the fourth B+ tree "down" into the third B+ tree also includes making the third B+ tree mutable. Thus, in some embodiments, act 416 comprises merging one or more records of the neighbor B+ tree into the subject B+ tree, changing a first snapshot identifier corresponding to the subject B+ tree to a second snapshot identifier corresponding to the neighbor B+ tree, and deleting the neighbor B+ tree from the ordered set of B+ trees.

Thus, as will be appreciated in view of the foregoing description, in a merge "up" situation, the actual merging/deletion matches the logical merging/deletion, while in a merge "down" situation, the actual merging/deletion is opposite from the logical merging/deletion, and is "fixed" to match the logical merge by swapping tree/snapshot identifiers (and, potentially, mutability). In some embodiments, the snapshot deletor 208 either always merges up or always merges down. In other embodiments, the snapshot deletor 208 determines whether to merge up or merge down by merging the B+ tree having a fewer number of records into the B+ tree having a greater number of records (i.e., so that the snapshot deletor 208 processes a fewer number of records).

Regardless of the merge direction used, as shown in FIG. 4C, act 416 may include an act 417 of partitioning intersecting rows. In embodiments, act 417 operates to ensure, as between the subject B+ tree and the neighbor B+ tree, that each record in one tree either (i) has no overlap with any record in the other tree, or (ii) entirely and exactly overlaps with a corresponding record in the other tree (e.g., they cover the exact same range of keys). In embodiments, act 417 comprises identifying a first record in the subject B+ tree that intersects with a second record in the neighbor B+ tree, the first record for a first key range and the second record for a different second key range. In other words, act 417 identifies a record in each tree that has at least some overlap. In embodiments, after identifying the first and second records, act 417 also comprises performing at least one of (A) splitting the first record into at least (i) a first new record in the subject B+ tree for a first portion of the first key range that does not intersect with the second key range, and (ii) a second new record in the subject B+ tree for a second portion of the first key range that entirely intersects with the second key range (i.e., splitting the first record into an entirely and exactly overlapping record, and a non-overlapping record); or (B) splitting the second record into at least (i) a third new record in the neighbor B+ tree for a first portion of the second key range that does not intersect with the first key range, and (ii) a fourth new record in the neighbor B+ tree for a second portion of the second key range that entirely intersects with the first key range (i.e., splitting the second record into an entirely and exactly overlapping record, and a non-overlapping record). In some embodiments, act 417 includes splitting only one of first or second records in order to produce records that either don't overlap at all or that entirely and exactly overlap. In other embodiments, act 417 includes splitting both the first record and the second record, such that the second portion of the first key range for the second new record is equal in size with the second portion of the second key range for the fourth new record (i.e., to produce entirely and exactly overlapping records).

Figure 5H:
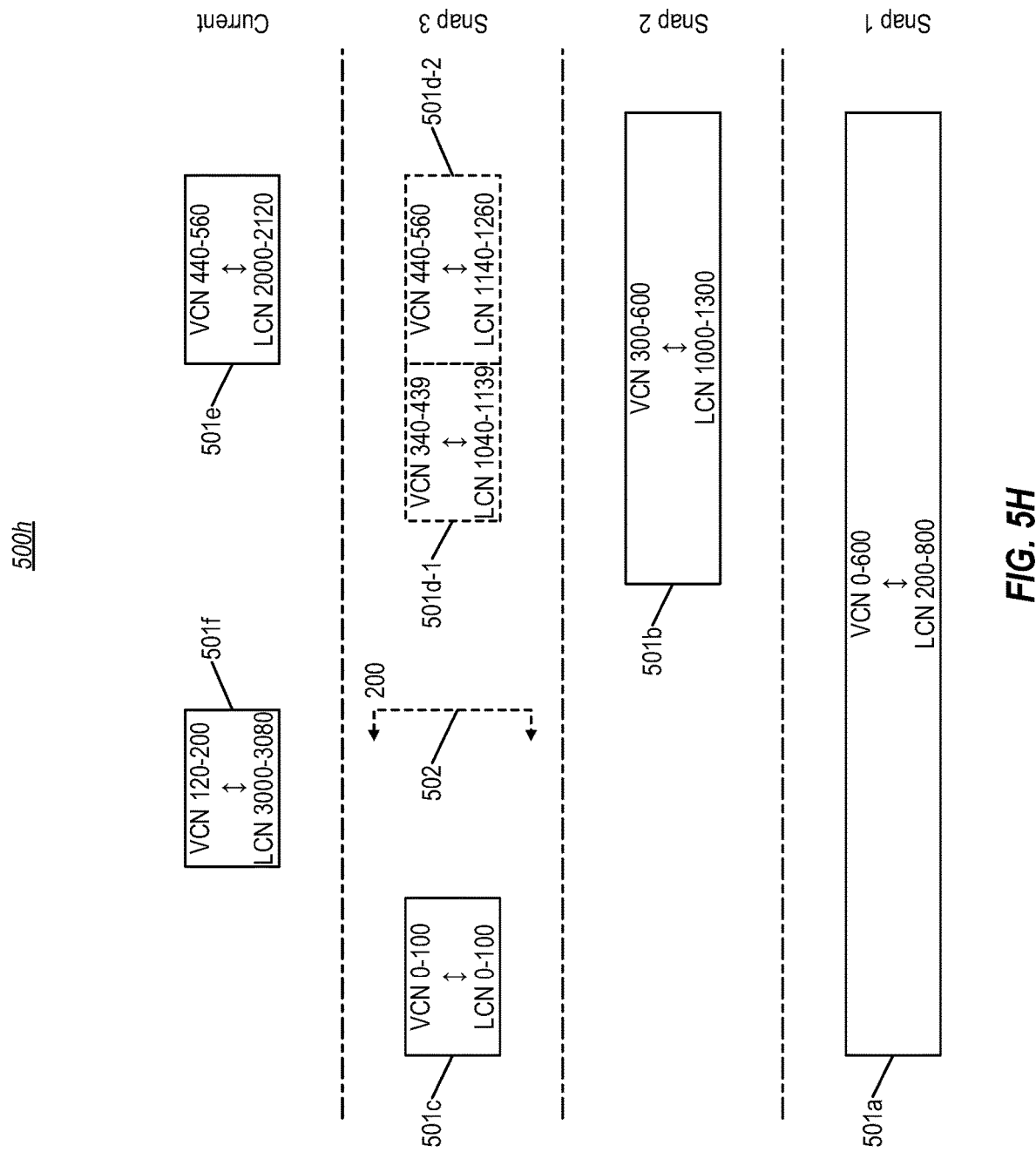
FIG. 5H illustrates an example of partitioning a record based on an intersection.

FIG. 5H illustrates an example 500*h* of partitioning a record based on an intersection. In particular, example 500*h* shows the records of example 500g, but shows that, based on an instruction from snapshot deletor 208, and based on record 501d intersecting with record 501e, the record manager 205 has split record 501d into a first record 501d-1 (i.e., covering VCNs 340-439 with a mapping to LCNs 1040-1139) and a second record 501d-2 (i.e., covering VCNs 440-560 with a mapping to LCNs 1140-1260). As such, after act 417, in the Current layer and in the Snap 3 layer all records either have no intersection, or exactly and entirely intersect.

Act 416 also includes one, or both, of an act 418 of pushing non-intersecting records, or an act 419 of merging intersecting records based on weak vs. strong reference status. No particular ordering of acts 418 and 419 is shown, and various embodiments perform acts 418 and 419 either parallelly or serially (in either order).

In some embodiments, act 418 comprises at least one of pushing a first record in the subject B+ tree that has no intersecting record in the neighbor B+ tree into the neighbor B+ tree (i.e., pushing a non-overlapping record "up"), or pushing a second record in the neighbor B+ tree that has no intersecting record in the subject B+ tree into the subject B+ tree (i.e., pushing a non-overlapping record "down"). For example, referring to FIG. 5H, in act 418 the snapshot deletor 208 instructs the record manager 205 to either (i) push records 501c and 501d-1 "up" from the Snap 3 layer to the Current layer (i.e. because records 501c and 501d-1 have no intersecting record(s) in the Snap 3 layer), or (ii) push record 501f "down" from the Current layer to the Snap 3 layer (i.e. because record 501f has have no intersecting record(s) in the Snap 3 layer).

In some embodiments, act 419 comprises at least one of merging a third record in the neighbor B+ tree into the subject B+ tree, the third record having a third intersecting record in the subject B+ tree, the third record and the third intersecting record having identical key ranges (i.e., merging an intersecting record "down"), or merging a fourth record in the subject B+ tree into the neighbor B+ tree, the fourth record having a fourth intersecting record in the neighbor B+ tree, the fourth record and the fourth intersecting record having identical key ranges (i.e., merging an intersecting record "up"). For example, referring to FIG. 5H, in act 419 the snapshot deletor 208 instructs the record manager 205 to merge records 501e and 501d-2 (i.e., because they entirely and exactly intersect). This merging is either "down" from the Current to the Snap 3 layer or "up" from the Snap 3 layer to the Current layer.

In embodiments, the particular manner of merging two entirely and exactly intersecting records, and any resource cleanup action associated therewith, depends on one or both of (i) where each record is located (i.e., in the "higher" layer corresponding to the neighbor B+ tree, or in the "lower" layer corresponding to the subject B+ tree), or (ii) whether each record has a weak reference status or a strong reference status. Table 1 summarizes the logical merging of two entirely and exactly intersecting records, according to one or more embodiments:

TABLE 1

| Upper Record | Lower Record | Merger Action(s) | Corresponding Resource Cleanup |
|---|---|---|---|
| Weak | Weak | Keep Upper Record (Lower Record Removed) | None |
| Strong | Weak | Keep Upper Record | None |
| Weak | Strong | Convert Upper Record to Strong (Lower Record Removed) | None |
| Strong | Strong | Keep Upper Record (Lower Record Removed) | Free Resource(s) Referenced by Lower Record |

Referring to Table 1, the first row specifies that when merging a weak upper record and a weak lower record, the upper record is logically kept after the merger. In embodiments, because both records are weak with no intervening strong records, these records had identical mappings prior to the merger (e.g., the exact same VCN to LCN mapping). Since the removed record was weak, the resources it referred to were dependent on an existing lower-level strong record, so no corresponding resources are freed in connection with its removal.

Also referring to Table 1, the second row specifies that when merging a strong upper record and a weak lower record, the upper record is logically kept after the merger. In embodiments, because the upper record was strong and the lower record was weak, the upper record had a different mapping than the lower record prior to the merger (e.g., the exact same VCNs, but different mapped LCNs). Since the removed record was weak, the resources it referred to were dependent on an existing lower-level strong record, so no corresponding resources are freed in connection with its removal.

Also referring to Table 1, the third row specifies that when merging a weak upper record and a strong lower record, the upper record is logically converted to a strong record. In embodiments, because the upper record was weak and the lower record was strong, these records had identical mappings prior to the merger (e.g., the exact same VCN to LCN mapping). Since the removed record was weak, the resources it referred to were dependent on an existing lower-level strong record, so no corresponding resources are freed in connection with its removal.

Also referring to Table 1, the fourth row specifies that when merging a strong upper record and a strong lower record, the upper record is logically kept after the merger. In embodiments, because the upper record was strong and the lower record was strong, the upper record had a different mapping than the lower record prior to the merger (e.g., the exact same VCNs, but different mapped LCNs). Since the removed record was strong, the resources it referred to were not dependent on an existing lower-level strong record, so the corresponding resources it referred to can be freed in connection with its removal (e.g., the LCNs is refers to can be marked as freed for reuse).

Figure 5I:
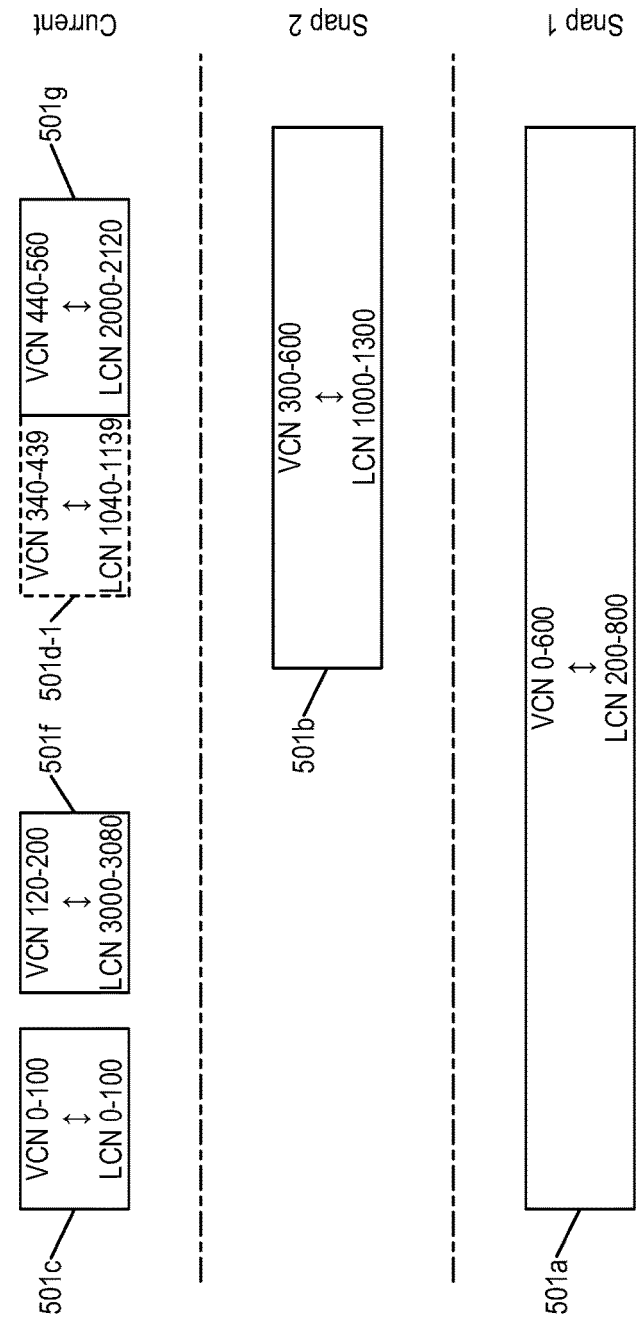
FIG. 5I illustrates an example of the dataset of FIG. 5H after a deletion and merging.

FIG. 5I illustrates an example 500i of the dataset of FIG. 5H after the deletion of Snap 3. In particular, FIG. 5I shows that, at least logically, the Snap 3 layer is now gone, and that the Current layer in example 500i now contains a merger/combination of the records from the Current and Snap 3 layers in example 500h. Notably, example 500i includes record 501g, which is a result of a merger of record 501e (a strong upper record) and record 501d-2 (a weak lower record); as such, record 501g is a strong record (i.e., per the second row of Table 1).

In view of the discussion of Table 1, it will be appreciated that, in some embodiment of act 419, merging a first record in the subject B+ tree with an equally-sized and entirely intersecting second record in the neighbor B+ tree includes performing one of the following:

i. based at least on the first record having a weak reference state, and based at least on the second record having the weak reference state, removing the first record without freeing one or more resources mapped to a key range for the first record (i.e., merging a weak upper record and a weak lower record), ii. based at least on the first record having the weak reference state, and based at least on the second record having a strong reference state, removing the first record without freeing the one or more resources mapped to the key range for the first record (i.e., merging a strong upper record and a weak lower record), iii. based at least on the first record having the strong reference state, and based at least on the second record having the weak reference state, removing the first record and converting the second record to the strong reference state without freeing the one or more resources mapped to the key range for the first record (i.e., merging a weak upper record and a strong lower record), or iv. based at least on the first record having the strong reference state, and based at least on the second record having the strong reference state, removing the first record and freeing the one or more resources mapped to the key range for the first record (i.e., merging a strong upper record and a strong lower record).

In embodiments, prior to performing the merger of act 416, the snapshot deletor 208 opportunistically obtains a merge lock on each of the subject and neighbor B+ trees. In embodiments, use of merge locks enables the simultaneous deletion of a plurality of snapshots. In embodiments, use of merge locks ensures that each B+ table involved in only one merger at a time. For example, referring to FIG. 5H, if both of Snap 2 and Snap 3 are to be deleted, the deletion could be accomplished by first deleting Snap 2 (which merges Snap 2 and Snap 3) and then deleting Snap 3 (which merges the new Snap 3 and Current). Alternatively, the deletion could be accomplished by first deleting Snap 3 (which merges Snap 3 and Current) and then deleting Snap 2 (which merges Snap 2 and the new Current). Use of merge locks ensures, for example, that Snap 3 cannot be simultaneously merged with both Current and Snap 2. In an example, if Snap 2 is deleted first, then the snapshot deletor 208 obtains merge locks on both the Snap 2 B+ tree and the Snap 3 B+ tree. In embodiments, while this merge lock on the Snap 3 B+ tree is active, the snapshot deletor 208 cannot obtain another merge lock on the Snap 3 B+ tree in order to merge Snap 3 and Current (i.e., as part of deleting Snap 3); as such, the snapshot deletor 208 can only delete Snap 3 after the merger of the Snap 2 B+ tree and the Snap 3 B+ tree is completed as part of deleting Snap 2, and the merge lock released on the Snap 3 B+ tree. As such, in embodiments, method 400c includes, prior to merging the neighbor B+ tree and the subject B+ tree, obtaining a merge lock on both the neighbor B+ tree and the subject B+ tree.

In embodiments, deletion of a snapshot is accomplished in O(1) time, by removing or deactivating a reference the B+ tree corresponding to the snapshot from the ordered set of B+ trees. In embodiments, this O(1) deletion performance is enabled by the use of weak and strong records within the B+ trees, as opposed to use of reference counting. For example, using weak and strong records enables a B+ tree corresponding to a snapshot to be deleted or dereferenced in order to deactivate any records in that B+ tree from an active set, and avoids the need to traverse one or more B+ trees in order to update reference counts.

As discussed, a B+ tree corresponding to a deleted snapshot is merged with a neighboring B+ tree. In embodiments, merger of a B+ tree with a neighboring B+ tree frees resources, including resources referred to by records in the B+ tree, and as well as resources associated with storing the B+ tree itself. In embodiments, this merging is accomplished asynchronously with other accesses to the dataset represented by the ordered set of B+ trees. Thus, the merging is accomplished without taking I/O locks on the dataset represented by the ordered set of B+ trees (and, correspondingly without taking I/O locks the resources associated with the dataset generally). Thus, for example, if the dataset corresponds to a file, this merger is accomplished without taking an I/O lock on the file generally. Instead, in embodiments, when merging a B+ tree corresponding to a deleted snapshot with a neighboring B+ tree, I/O locks are obtained granularly at the level of a record or a page.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A computer system comprising:
   at least one processor;
   a memory; and
   at least one computer-readable medium having stored thereon computer-executable instructions that are executable by the at least one processor to cause the computer system to manage snapshotting of a dataset using an ordered set of B+ trees representing the dataset, the computer-executable instructions including instructions that are executable by the at least one processor to cause the computer system to perform at least the following:
   based at least on receiving a request to create a snapshot of the dataset,
      identify the ordered set of B+ trees, each leaf node within each B+ tree in the ordered set of B+ trees representing a corresponding page key range and storing zero or more records for the corresponding key range, and a corresponding range of resources mapped thereto, that falls within the corresponding page key range;
      identify an existing B+ tree within the ordered set of B+ trees, the existing B+ tree being mutable and being a beginning B+ tree in the ordered set of B+ trees; and
      convert the existing B+ tree to an immutable state, the existing B+ tree corresponding to the requested snapshot of the dataset, and insert a new B+ tree in front of the existing B+ tree in the ordered set of B+ trees to become the beginning B+ tree in the ordered set of B+ trees, the new B+ tree being empty and mutable; and after inserting the new B+ tree into to the ordered set of B+ trees, and based at least on receiving a request that includes a requested key, starting with the beginning B+ tree, progressively search each B+ tree in the ordered set of B+ trees, until a particular B+ tree is identified that includes a particular leaf node storing a particular record for the particular key range that overlaps with the requested key;

store a new record within a leaf node of the new B+ tree, the new record (i) corresponding to a key range, and a range of resources mapped thereto, that starts with the requested key and that includes at least a subset of the particular key range, and (ii) being flagged as having a weak reference state that is dependent on the particular record;

subsequent to storing the new record, modify the range of resources mapped to the key range of the new record; and based at least on modifying the range of resources mapped to the key range of the new record, flag the new record as having a strong reference state that is independent of any lower intersecting record.

2. The computer system of claim 1, wherein the key range of the new record is identified based at least on a count from the requested key.

3. The computer system of claim 2, the computer-executable instructions also including instructions that are executable by the at least one processor to cause the computer system to determine the count based at least on choosing a minimum of:

a smallest beginning key of one or more key ranges that intersect with the particular key range, the one or more key ranges corresponding to one or more records stored in one or more first B+ trees that are prior to the particular B+ tree in the ordered set of B+ trees; or a smallest ending key of one or more page key ranges that are represented by one or more second B+ trees that are prior to the particular B+ tree in the ordered set of B+ trees, the smallest ending key being greater than the requested key, each of the one or more page key ranges in the one or more second B+ trees lacking any record for key ranges greater than the requested key.

4. The computer system of claim 1, the computer-executable instructions also including instructions that are executable by the at least one processor to cause the computer system to:

prior to storing the new record within the leaf node of the new B+ tree, store the new record within the memory as a synthesized record; and pin the key range of the new record within the new B+ tree.

5. The computer system of claim 1, the computer-executable instructions also including instructions that are executable by the at least one processor to cause the computer system to perform at least the following based at least on receiving a request to delete an identified snapshot of the dataset:

identify a subject B+ tree in the ordered set of B+ trees that corresponds to the identified snapshot;

identify a neighbor B+ tree that precedes the subject B+ tree in the ordered set of B+ trees; and merge the neighbor B+ tree and the subject B+ tree based on at least one of:

pushing a first record in the subject B+ tree that has no intersecting record in the neighbor B+ tree into the neighbor B+ tree;

pushing a second record in the neighbor B+ tree that has no intersecting record in the subject B+ tree into the subject B+ tree;

merging a third record in the neighbor B+ tree into the subject B+ tree, the third record having a third intersecting record in the subject B+ tree, the third record and the third intersecting record having identical key ranges; or merging a fourth record in the subject B+ tree into the neighbor B+ tree, the fourth record having a fourth intersecting record in the neighbor B+ tree, the fourth record and the fourth intersecting record having identical key ranges.

6. The computer system of claim 1, the computer-executable instructions also including instructions that are executable by the at least one processor to cause the computer system to perform at least the following based at least on receiving a request to delete an identified snapshot of the dataset:

identify a subject B+ tree in the ordered set of B+ trees that corresponds to the identified snapshot;

identify a neighbor B+ tree that precedes the subject B+ tree in the ordered set of B+ trees; and merge the neighbor B+ tree and the subject B+ tree based at least on identifying a first record in the subject B+ tree that intersects with a second record in the neighbor B+ tree, the first record for a first key range and the second record for a different second key range, and performing at least one of:

splitting the first record into at least (i) a first new record in the subject B+ tree for a first portion of the first key range that does not intersect with the second key range, and (ii) a second new record in the subject B+ tree for a second portion of the first key range that entirely intersects with the second key range; or splitting the second record into at least (i) a third new record in the neighbor B+ tree for a first portion of the second key range that does not intersect with the first key range, and (ii) a fourth new record in the neighbor B+ tree for a second portion of the second key range that entirely intersects with the first key range.

7. The computer system of claim 6, wherein the computer-executable instructions cause the computer system to split both the first record and the second record, and wherein the second portion of the first key range for the second new record is equal in size with the second portion of the second key range for the fourth new record.

8. The computer system of claim 1, the computer-executable instructions also including instructions that are executable by the at least one processor to cause the computer system to perform at least the following based at least on receiving a request to delete an identified snapshot of the dataset:

identify a subject B+ tree in the ordered set of B+ trees that corresponds to the identified snapshot;

identify a neighbor B+ tree that precedes the subject B+ tree in the ordered set of B+ trees; and merge the neighbor B+ tree and the subject B+ tree based at least on merging a first record in the subject B+ tree with an equally-sized and entirely intersecting second record in the neighbor B+ tree, including performing one of the following:

based at least on the first record having a weak reference state, and based at least on the second record having the weak reference state, removing the first record without freeing one or more resources mapped to a key range for the first record;

based at least on the first record having the weak reference state, and based at least on the second record having a strong reference state, removing the first record without freeing the one or more resources mapped to the key range for the first record;

based at least on the first record having the strong reference state, and based at least on the second record having the weak reference state, removing the first record and converting the second record to the strong reference state without freeing the one or more resources mapped to the key range for the first record; or based at least on the first record having the strong reference state, and based at least on the second record having the strong reference state, removing the first record and freeing the one or more resources mapped to the key range for the first record.

9. The computer system of claim 5, wherein merging the neighbor B+ tree and the subject B+ tree comprises:

merging one or more records of the neighbor B+ tree into the subject B+ tree;

changing a first snapshot identifier corresponding to the subject B+ tree to a second snapshot identifier corresponding to the neighbor B+ tree; and deleting the neighbor B+ tree from the ordered set of B+ trees.

10. The computer system of claim 5, wherein merging the neighbor B+ tree and the subject B+ tree comprises:

merging one or more records of the subject B+ tree into the neighbor B+ tree; and deleting the subject B+ tree from the ordered set of B+ trees.

11. The computer system of claim 5, the computer-executable instructions also including instructions that are executable by the at least one processor to cause the computer system to, prior to merging the neighbor B+ tree and the subject B+ tree, obtain a merge lock on both the neighbor B+ tree and the subject B+ tree.

12. The computer system of claim 1, wherein the dataset represents at least virtual cluster number (VCN) to logical cluster number (LCN) mappings of a file, wherein each key range is a range of VCNs, and wherein each range of resources is a range of LCNs.

13. A method, implemented at a computer system that includes at least one processor, for managing snapshotting of a dataset using an ordered set of B+ trees representing the dataset, the method comprising:

based at least on receiving a request to create a snapshot of the dataset, identifying the ordered set of B+ trees, each leaf node within each B+ tree in the ordered set of B+ trees representing a corresponding page key range and storing zero or more records for the corresponding key range, and a corresponding range of resources mapped thereto, that falls within the corresponding page key range;

identifying an existing B+ tree within the ordered set of B+ trees, the existing B+ tree being mutable and being a beginning B+ tree in the ordered set of B+ trees; and converting the existing B+ tree to an immutable state, the existing B+ tree corresponding to the requested snapshot of the dataset, and inserting a new B+ tree in front of the existing B+ tree in the ordered set of B+ trees to become the beginning B+ tree in the ordered set of B+ trees, the new B+ tree being empty and mutable; and after inserting the new B+ tree into to the ordered set of B+ trees, and based at least on receiving a request that includes a requested key, starting with the beginning B+ tree, progressively searching each B+ tree in the ordered set of B+ trees, until a particular B+ tree is identified that includes a particular leaf node storing a particular record for the particular key range that overlaps with the requested key;

storing a new record within a leaf node of the new B+ tree, the new record (i) corresponding to a key range, and a range of resources mapped thereto, that starts with the requested key and that includes at least a subset of the particular key range, and (ii) being flagged as having a weak reference state that is dependent on the particular record;

subsequent to storing the new record, modifying the range of resources mapped to the key range of the new record; and based at least on modifying the range of resources mapped to the key range of the new record, flagging the new record as having a strong reference state that is independent of any lower intersecting record.

14. The method of claim 13, further comprising performing at least the following based at least on receiving a request to delete an identified snapshot of the dataset:

identifying a subject B+ tree in the ordered set of B+ trees that corresponds to the identified snapshot;

identifying a neighbor B+ tree that precedes the subject B+ tree in the ordered set of B+ trees; and merging the neighbor B+ tree and the subject B+ tree based on at least one of:

pushing a first record in the subject B+ tree that has no intersecting record in the neighbor B+ tree into the neighbor B+ tree;

pushing a second record in the neighbor B+ tree that has no intersecting record in the subject B+ tree into the subject B+ tree;

merging a third record in the neighbor B+ tree into the subject B+ tree, the third record having a third intersecting record in the subject B+ tree, the third record and the third intersecting record having identical key ranges; or merging a fourth record in the subject B+ tree into the neighbor B+ tree, the fourth record having a fourth intersecting record in the neighbor B+ tree, the fourth record and the fourth intersecting record having identical key ranges.

15. The method of claim 13, further comprising performing at least the following based at least on receiving a request to delete an identified snapshot of the dataset:

identifying a subject B+ tree in the ordered set of B+ trees that corresponds to the identified snapshot;

identifying a neighbor B+ tree that precedes the subject B+ tree in the ordered set of B+ trees; and merging the neighbor B+ tree and the subject B+ tree based at least on identifying a first record in the subject B+ tree that intersects with a second record in the neighbor B+ tree, the first record for a first key range and the second record for a different second key range, and performing at least one of:

splitting the first record into at least (i) a first new record in the subject B+ tree for a first portion of the first key range that does not intersect with the second key range, and (ii) a second new record in the subject B+ tree for a second portion of the first key range that entirely intersects with the second key range; or splitting the second record into at least (i) a third new record in the neighbor B+ tree for a first portion of the second key range that does not intersect with the first key range, and (ii) a fourth new record in the neighbor B+ tree for a second portion of the second key range that entirely intersects with the first key range.

16. The method of claim 13, further comprising performing at least the following based at least on receiving a request to delete an identified snapshot of the dataset:

identifying a subject B+ tree in the ordered set of B+ trees that corresponds to the identified snapshot;

identifying a neighbor B+ tree that precedes the subject B+ tree in the ordered set of B+ trees; and merging the neighbor B+ tree and the subject B+ tree based at least on merging a first record in the subject B+ tree with an equally-sized and entirely intersecting second record in the neighbor B+ tree, including performing one of the following:

based at least on the first record having a weak reference state, and based at least on the second record having the weak reference state, removing the first record without freeing one or more resources mapped to a key range for the first record;

based at least on the first record having the weak reference state, and based at least on the second record having a strong reference state, removing the first record without freeing the one or more resources mapped to the key range for the first record;

based at least on the first record having the strong reference state, and based at least on the second record having the weak reference state, removing the first record and converting the second record to the strong reference state without freeing the one or more resources mapped to the key range for the first record; or based at least on the first record having the strong reference state, and based at least on the second record having the strong reference state, removing the first record and freeing the one or more resources mapped to the key range for the first record.

17. The method of claim 14, wherein merging the neighbor B+ tree and the subject B+ tree comprises at least one of:

merging one or more records of the neighbor B+ tree into the subject B+ tree, changing a first snapshot identifier corresponding to the subject B+ tree to a second snapshot identifier corresponding to the neighbor B+ tree, and deleting the neighbor B+ tree from the ordered set of B+ trees; or merging one or more records of the subject B+ tree into the neighbor B+ tree, and deleting the subject B+ tree from the ordered set of B+ trees.

18. A computer program product comprising at least one computer-readable medium having stored thereon computer-executable instructions that are executable by at least one processor to cause a computer system to manage snapshotting of a dataset using an ordered set of B+ trees representing the dataset, the computer-executable instructions including instructions that are executable by the at least one processor to cause the computer system to perform at least the following:

based at least on receiving a request to create a snapshot of the dataset, identify the ordered set of B+ trees, each leaf node within each B+ tree in the ordered set of B+ trees representing a corresponding page key range and storing zero or more records for the corresponding key range, and a corresponding range of resources mapped thereto, that falls within the corresponding page key range;

identify an existing B+ tree within the ordered set of B+ trees, the existing B+ tree being mutable and being a beginning B+ tree in the ordered set of B+ trees; and convert the existing B+ tree to an immutable state, the existing B+ tree corresponding to the requested snapshot of the dataset, and insert a new B+ tree in front of the existing B+ tree in the ordered set of B+ trees to become the beginning B+ tree in the ordered set of B+ trees, the new B+ tree being empty and mutable; and after inserting the new B+ tree into to the ordered set of B+ trees, and based at least on receiving a request that includes a requested key, starting with the beginning B+ tree, progressively search each B+ tree in the ordered set of B+ trees, until a particular B+ tree is identified that includes a particular leaf node storing a particular record for the particular key range that overlaps with the requested key;

store a new record within a leaf node of the new B+ tree, the new record (i) corresponding to a key range, and a range of resources mapped thereto, that starts with the requested key and that includes at least a subset of the particular key range, and (ii) being flagged as having a weak reference state that is dependent on the particular record;

subsequent to storing the new record, modify the range of resources mapped to the key range of the new record; and based at least on modifying the range of resources mapped to the key range of the new record, flag the new record as having a strong reference state that is independent of any lower intersecting record.

19. The computer program product of claim 18, the computer-executable instructions also including instructions that are executable by the at least one processor to cause the computer system to perform at least the following based at least on receiving a request to delete an identified snapshot of the dataset:

identify a subject B+ tree in the ordered set of B+ trees that corresponds to the identified snapshot;

identify a neighbor B+ tree that precedes the subject B+ tree in the ordered set of B+ trees; and merge the neighbor B+ tree and the subject B+ tree based on at least one of:

pushing a first record in the subject B+ tree that has no intersecting record in the neighbor B+ tree into the neighbor B+ tree;

pushing a second record in the neighbor B+ tree that has no intersecting record in the subject B+ tree into the subject B+ tree;

merging a third record in the neighbor B+ tree into the subject B+ tree, the third record having a third intersecting record in the subject B+ tree, the third record and the third intersecting record having identical key ranges; or merging a fourth record in the subject B+ tree into the neighbor B+ tree, the fourth record having a fourth intersecting record in the neighbor B+ tree, the fourth record and the fourth intersecting record having identical key ranges.

* * * * *